(12) United States Patent
Webb

(10) Patent No.: US 9,722,440 B2
(45) Date of Patent: Aug. 1, 2017

(54) MODULAR OBJECT HOLDER

(71) Applicant: Brian Scott Webb, Tallahassee, FL (US)

(72) Inventor: Brian Scott Webb, Tallahassee, FL (US)

(*) Notice: Subject to any disclaimer, the term of this patent is extended or adjusted under 35 U.S.C. 154(b) by 113 days.

(21) Appl. No.: 14/587,159

(22) Filed: Dec. 31, 2014

(65) Prior Publication Data

US 2016/0190838 A1    Jun. 30, 2016

(51) Int. Cl.
*H02J 7/00* (2006.01)
*F16M 11/28* (2006.01)
*F16M 11/04* (2006.01)
*F16M 11/20* (2006.01)
*A47C 21/00* (2006.01)

(52) U.S. Cl.
CPC ............ *H02J 7/0044* (2013.01); *A47C 21/00* (2013.01); *F16M 11/041* (2013.01); *F16M 11/2014* (2013.01); *F16M 11/28* (2013.01)

(58) Field of Classification Search
CPC ....... H02J 7/0042; H02J 7/0044; H02J 7/0045
USPC ........................................................ 320/115
See application file for complete search history.

(56) References Cited

U.S. PATENT DOCUMENTS

| 2008/0079292 A1* | 4/2008 | Mitchell | A47B 21/06 297/172 |
| 2015/0374117 A1* | 12/2015 | Lozano | A47B 19/06 320/107 |

* cited by examiner

*Primary Examiner* — Arun Williams
(74) *Attorney, Agent, or Firm* — J. Wiley Horton; Adrienne C. Love

(57) ABSTRACT

An object holder adapted to hold a wide variety of objects including beverage holders such as cups, bottles, mugs, and tumblers; electronic devices such as mobile phones and tablets; remote controls; eating and writing utensils; and books. The device preferably includes a base, an upright extending upward from the base, and a receiver near the top of the upright. The receiver preferably includes an object holder which is preferably made detachable so that it may be washed in a dishwasher. The height of the receiver with respect to the base is adjustable in the present invention. The rotation of the receiver with respect to the base is preferably also made adjustable. The adjustment mechanism may preferably be activated using only one hand.

20 Claims, 31 Drawing Sheets

MODULAR OBJECT HOLDER

CROSS-REFERENCES TO RELATED APPLICATIONS

This non-provisional patent application is a continuation-in-part of U.S. application Ser. No. 14/157,816, filed on Jan. 17, 2014, which is a continuation-in-part of U.S. application Ser. No. 13/776,925, filed on Feb. 26, 2013, which is a continuation-in-part of U.S. application Ser. No. 12/942,243, filed on Nov. 9, 2010. All applications list the same inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of object holders. More specifically, the present invention comprises a modular object holder that includes at least a height adjusting feature and preferably an angular rotation adjusting feature as well.

2. Description of the Related Art

The need to provide a resting surface for objects, such as remote controls for a television set, mobile phones, books, etc. has long been recognized. The simplest solution to this problem is the provision of an end table (for a couch or chair) or a nightstand (for a bed). These pieces of furniture provide a horizontal surface near the user's position. The user may then place the desired object on this horizontal surface.

Of course, end tables and nightstands are relatively expensive and fixed in one location. Thus, some inventors have explored the possibility of a less expensive solution which may be attached directly to the furniture itself. An example of this approach is found in U.S. Pat. No. 4,836,113 to Waddell (1989). The Waddell device provides a flat tray adjacent to a bed frame. A similar approach is taken in U.S. Pat. No. D550,981 to Watson (2007) and U.S. Pat. No. 5,038,434 to Navarrette (1991).

A particular problem recognized in the prior art is the provision of an object holder for a hospital bed. It is generally not practical to provide a stationary end table or nightstand next to a hospital bed, since access must be provided to all portions of the patient. In addition, side rails and other features of the bed are designed to slide or fold away rapidly. Any object holder is preferably compatible with the existing hardware and preferably easy to remove in the event that rapid access to the patient is requires. The present invention solves these and other problems, as will be described more particularly in the following text.

BRIEF SUMMARY OF THE INVENTION

The present invention comprises an object holder adapted to hold a wide variety of objects including beverage containers, television remote controls, mobile phones, books, pre-packaged snacks and candies, writing and eating utensils, and other objects with similar size and shape. The device preferably includes a base, an upright extending upward from the base, and a receiver near the top of the upright. The receiver preferably includes an object holder which is preferably made detachable so that it may be washed in a dishwasher or using another method. In a preferred embodiment of the present invention, the receiver includes at least one pocket having dimensions capable of accommodating a cellular phone, remote control, or other device.

The height of the receiver with respect to the base is adjustable in the present invention. The rotation of the receiver with respect to the base is preferably also made adjustable. The adjustment mechanism may preferably be activated using only one hand.

BRIEF DESCRIPTION OF THE SEVERAL VIEWS OF THE DRAWINGS

FIG. 23A is a detail view, showing more detail of the cord securing slot located in the receptacle.

FIG. 24A is a detailed view, showing the securing feature used on an electronic device cord and plug.

Figure 1:
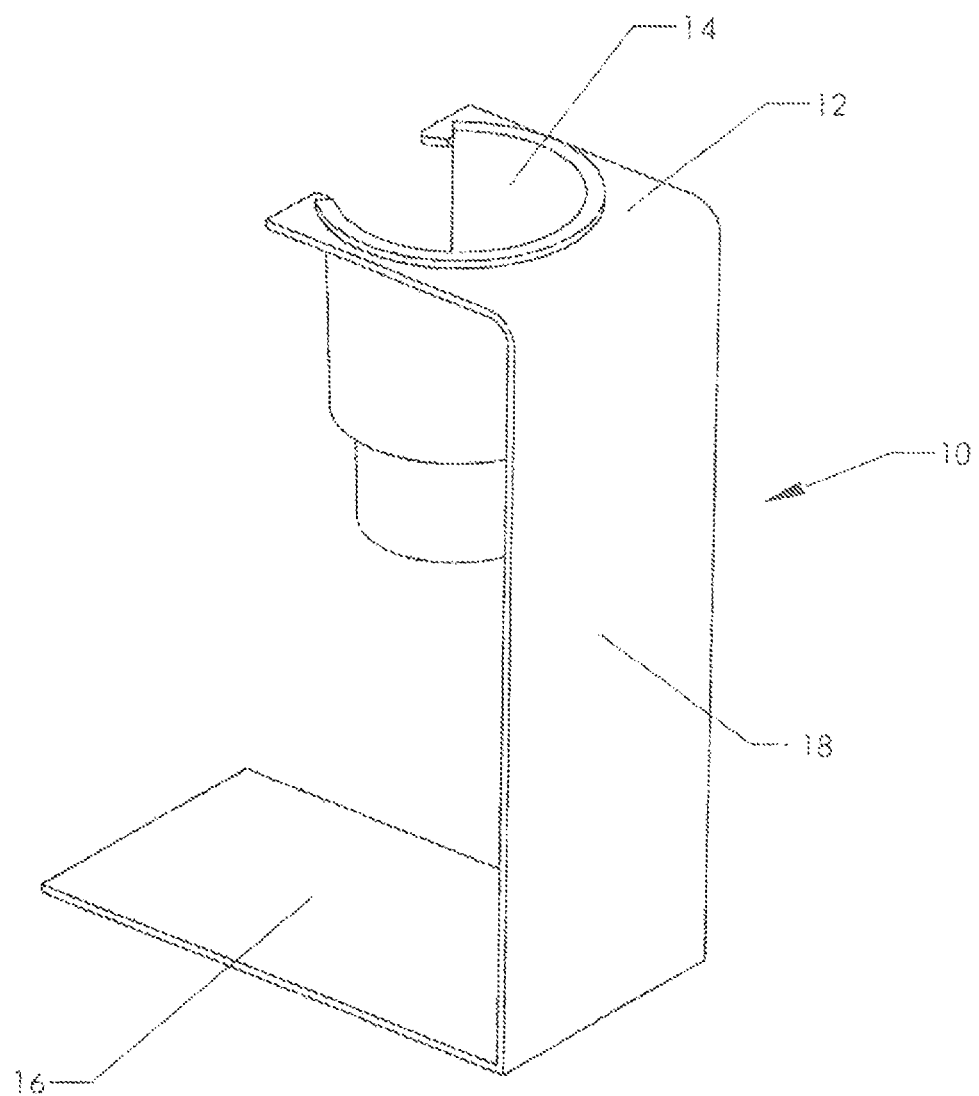
FIG. 1 is a perspective view, showing an embodiment of the present invention.

| REFERENCE NUMERALS IN THE DRAWINGS | | | |
|---|---|---|---|
| 10 | object-holding stand | 12 | receiver |
| 14 | cup holder | 16 | base |
| 18 | upright | 20 | box spring |
| 22 | mattress | 24 | lip |
| 26 | holder cutout | 28 | receiver cutout |
| 30 | circular relief | 32 | notch |
| 34 | edge | 36 | step |
| 38 | small portion | 40 | large portion |
| 42 | coffee mug | 44 | handle |
| 46 | can | 48 | insulating jacket |
| 50 | upper surface | 52 | tumbler |
| 54 | notch | 56 | rib |
| 58 | release button | 60 | base tube |
| 62 | extension slide | 64 | release rod |
| 66 | cone shaft | 68 | compression spring |
| 70 | expanding mandrel | 72 | expansion cone |
| 74 | expanding tab | 76 | slit |
| 78 | tube shank | 80 | through hole |
| 82 | retainer | 84 | cutout flange |
| 86 | ladder frame | 88 | extension slide |
| 90 | actuator | 92 | window |
| 94 | flex tang | 96 | protrusion |
| 98 | receptacle | 100 | support |
| 102 | receptacle slot | 104 | large area |
| 106 | small area | 108 | plug |
| 110 | cord | 112 | central receptacle |
| 114 | secondary receptacle | 116 | object |
| 118 | object | 120 | removable receptacle |
| 122 | cable slot | 124 | receiver relief |
| 126 | lip | 128 | locking mechanism |
| 130 | cable | 132 | connector |
| 134 | charging dock | | |

DETAILED DESCRIPTION OF THE INVENTION

The present invention provides a resting place for a variety of objects, including a beverage container when the user is not actually holding the beverage container. FIG. 1 shows an embodiment that is used to hold a beverage container. Object-holding stand 10 includes base 16, upright 18, and receiver 12. Upright 18 extends upward from base 16 to any desired height. Receiver 12 is connected to the upper end of upright 18. Cup holder 14 is attached to receiver 12.

In some embodiments the cup holder is integral to the receiver itself. However, in the cup holder embodiment of the present invention, the cup holder is preferably made removable. The cup holder will accumulate small quantities of spilled liquid over time. The spilled liquid tarnishes the appearance of the device and may in some instances create an unsanitary hazard. Making the cup holder removable allows it to be more easily cleaned—such as by placing it in a dishwasher.

Figure 2:
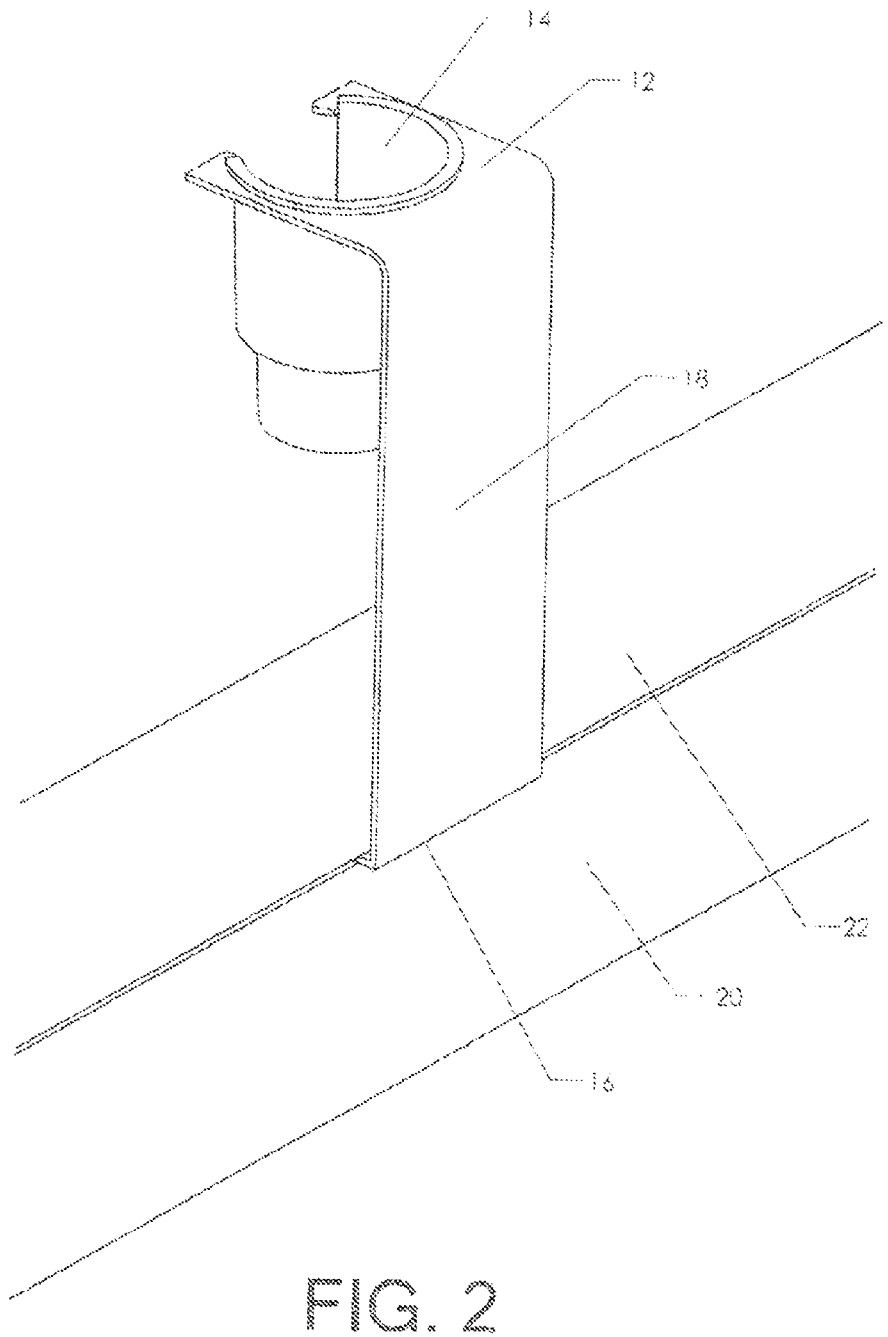
FIG. 2 is a perspective view, showing the embodiment of FIG. 1 attached to a bed.

In the embodiment of FIG. 1, base 16 is elongated so that it may be captured between two elements of a piece of furniture. As an example, FIG. 2 shows the stand with base 16 inserted between box spring 20 and mattress 22. Upright 18 is preferably made long enough to place receiver 12 well above the upper level of the mattress when the unit is installed. The same method may be used to secure the device to a couch or chair. In that scenario, base 16 is inserted between the cushion and the frame.

Figure 3:
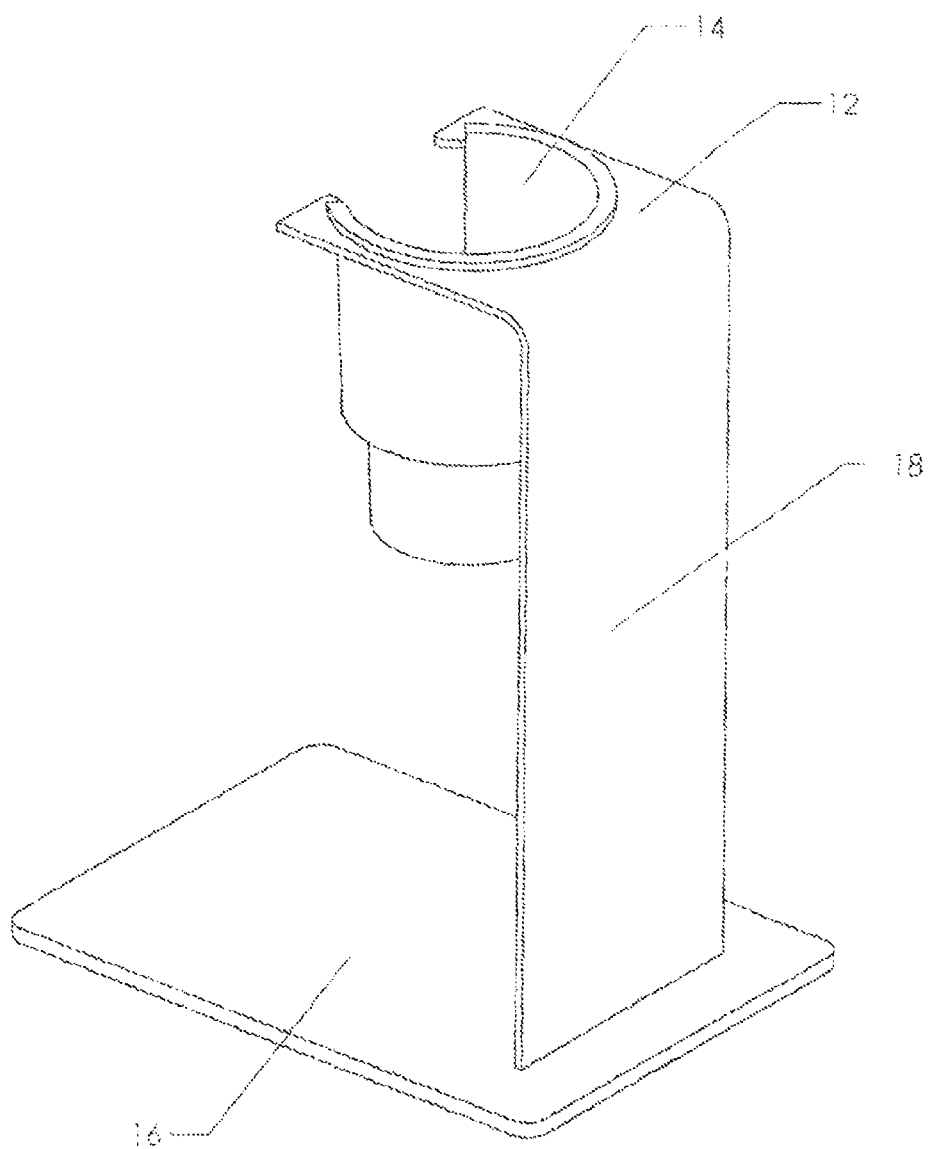
FIG. 3 is a perspective view of an alternate embodiment, including a larger base.

Other embodiments may be configured to rest directly on the floor. FIG. 3 shows an embodiment in which base 16 is enlarged in all directions so that it provides stable support when the unit is placed directly on the floor. Upright 18 is sized so that cup holder 14 will rest at the same height as an arm rest or side table.

Figure 4:
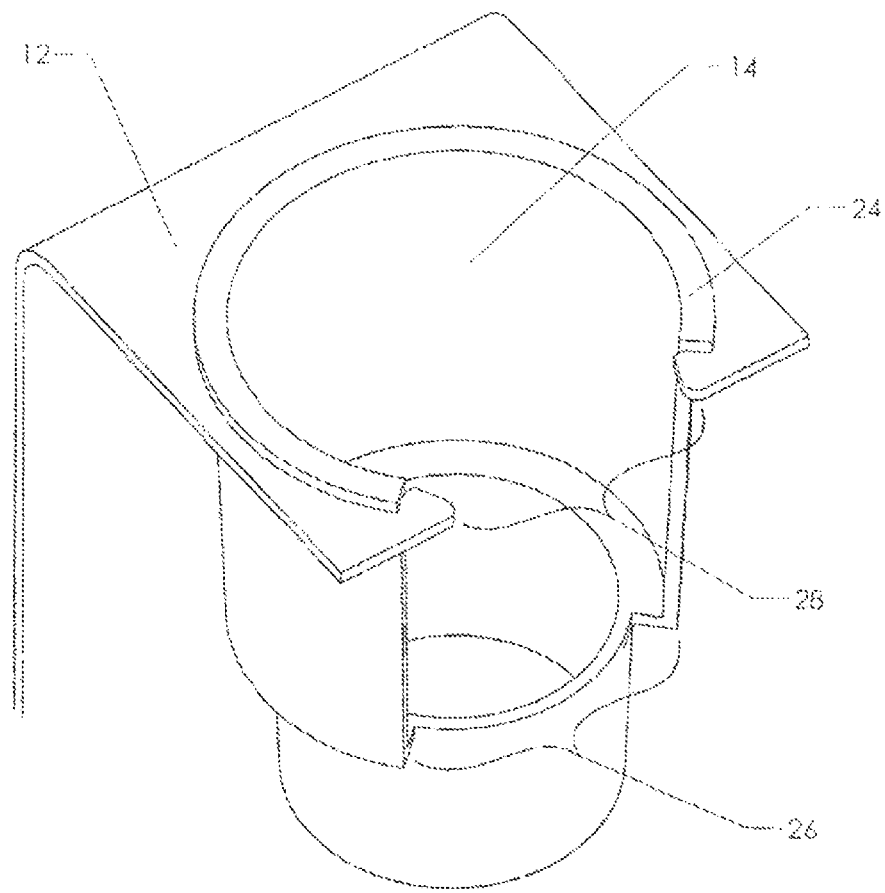
FIG. 4 is a detailed perspective view, showing the detachable cup holder in its receiver.

As stated previously, some embodiments include a removable cup holder. FIG. 4 shows this configuration in more detail. Cup holder 14 is provided with lip 24 which extends over the upward facing surface of receiver 12. Thus, the cup holder may be lowered into position but it cannot pass completely through the receiver.

The cup holder includes a cutout sized to accommodate the handle of a coffee mug. Holder cutout 26 passes through the vertical side wall of cup holder 14. Receiver cutout 28 passes through the corresponding portion of receiver 12. It is preferable to provide a rotation-limiting connection between the cup holder and the receiver so that the two cutouts are aligned when the cup holder is placed in the receiver.

Figure 5:
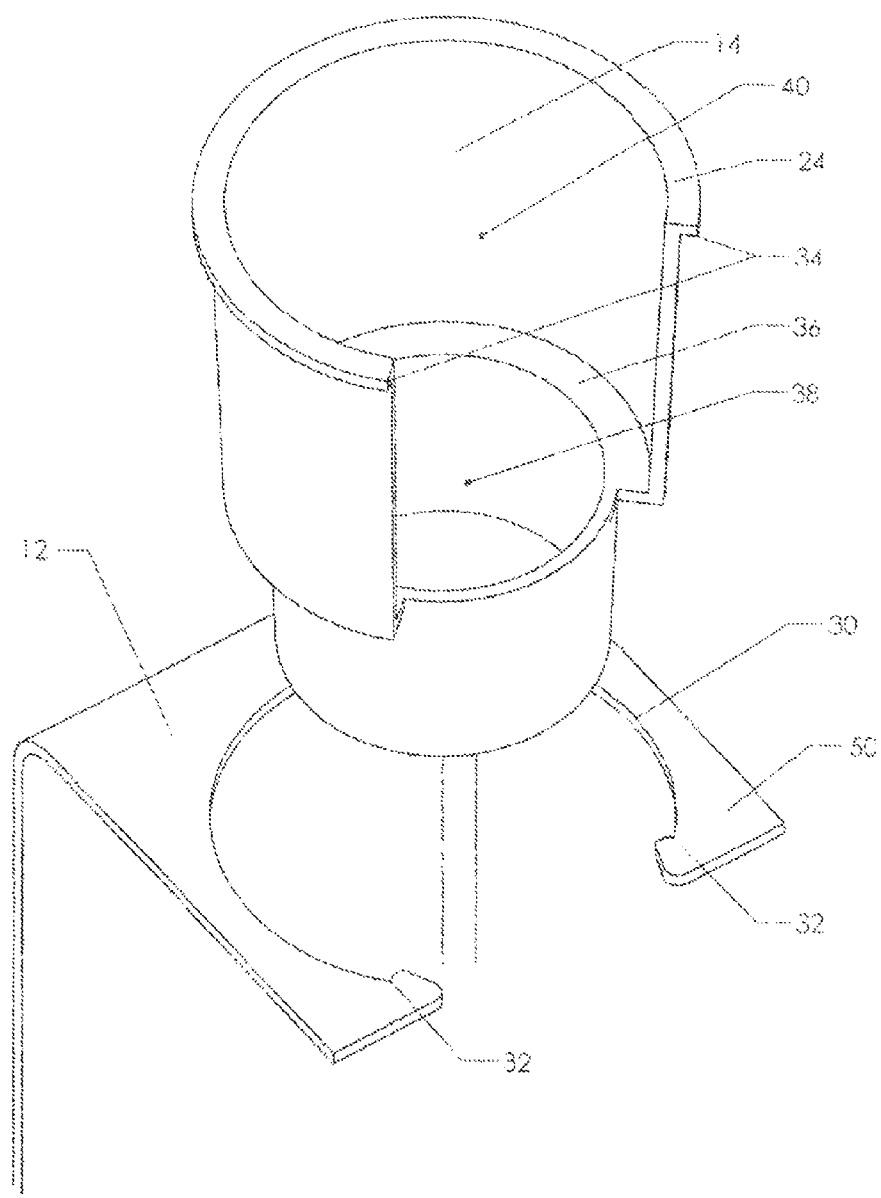
FIG. 5 is an exploded perspective view, showing the cup holder removed from the receiver.

The rotation-limiting connection may assume many forms. FIG. 5 shows an example of such a connection. Receiver 12 includes circular relief 30 which is sized to receiver large portion 40 of cup holder 14 without allowing lip 24 to pass through. The cup holder rests within circular relief 30 but lip 24 bears against upper surface 50. Circular relief 30 includes one or more notches 32 which are positioned to engage edges 34 on the cutout in the vertical side wall of the cup holder. Thus, when the cup holder is placed in the receiver, the cup holder is unable to rotate with respect to the receiver. In addition, the engagement of the notches with the two edges properly aligns the cutout in the cup holder with the cutout in the receiver.

The size and shape of the cup holder may assume many forms. FIG. 5 shows a version including large portion 40 and small portion 38. Step 36 lies at the junction between the large portion and the small portion. Step provides a horizontal surface which engages the bottom of a typical coffee mug. On the other hand, the base of a large tumbler will typically be small enough to pass beyond step 36 and into small portion 38.

Figure 6:
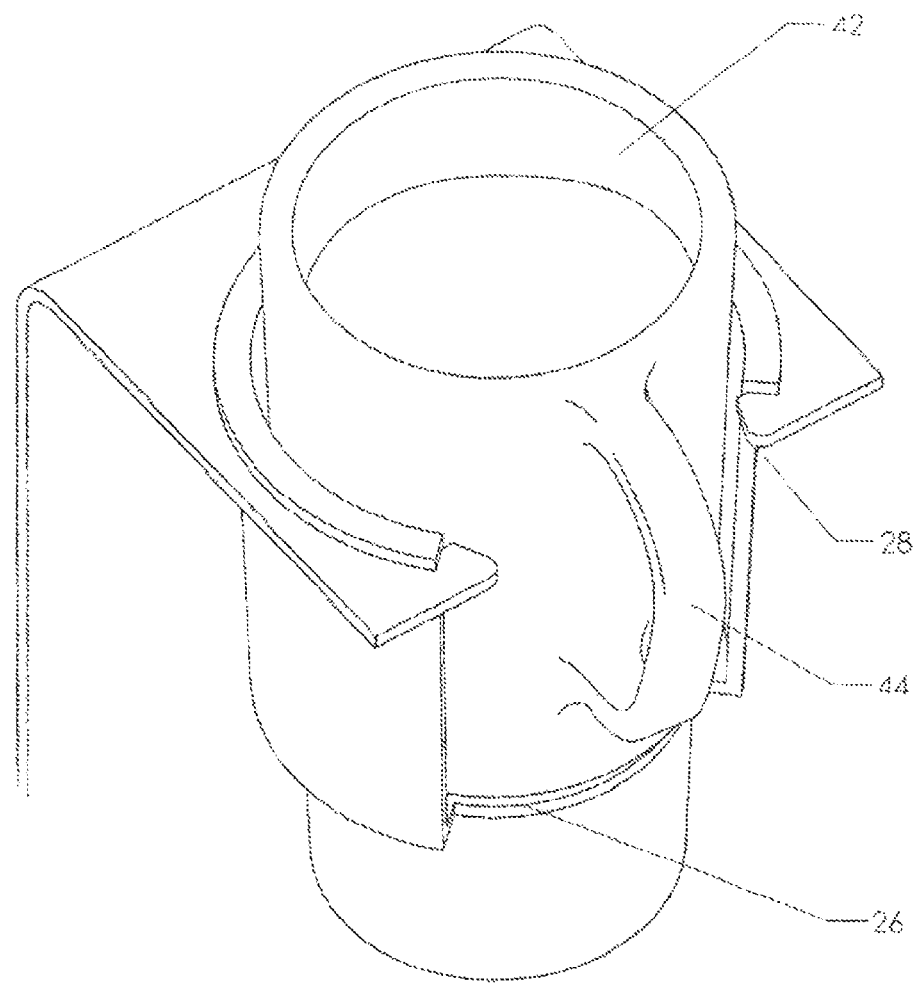
FIG. 6 is a detailed perspective view, showing a coffee cup retained by the cup holder.

FIG. 6 shows the same embodiment with coffee mug 42 in position within the cup holder. The reader will observe how handle 44 protrudes through holder cutout 26 and receiver cutout 28. The user may grasp the handle and use it to remove the mug from the cup holder or place the mug back in the cup holder. Sufficient clearance is preferably provided on each side of handle 44 to avoid interference between the cup holder and the user's thumb and fingers.

Figure 7:
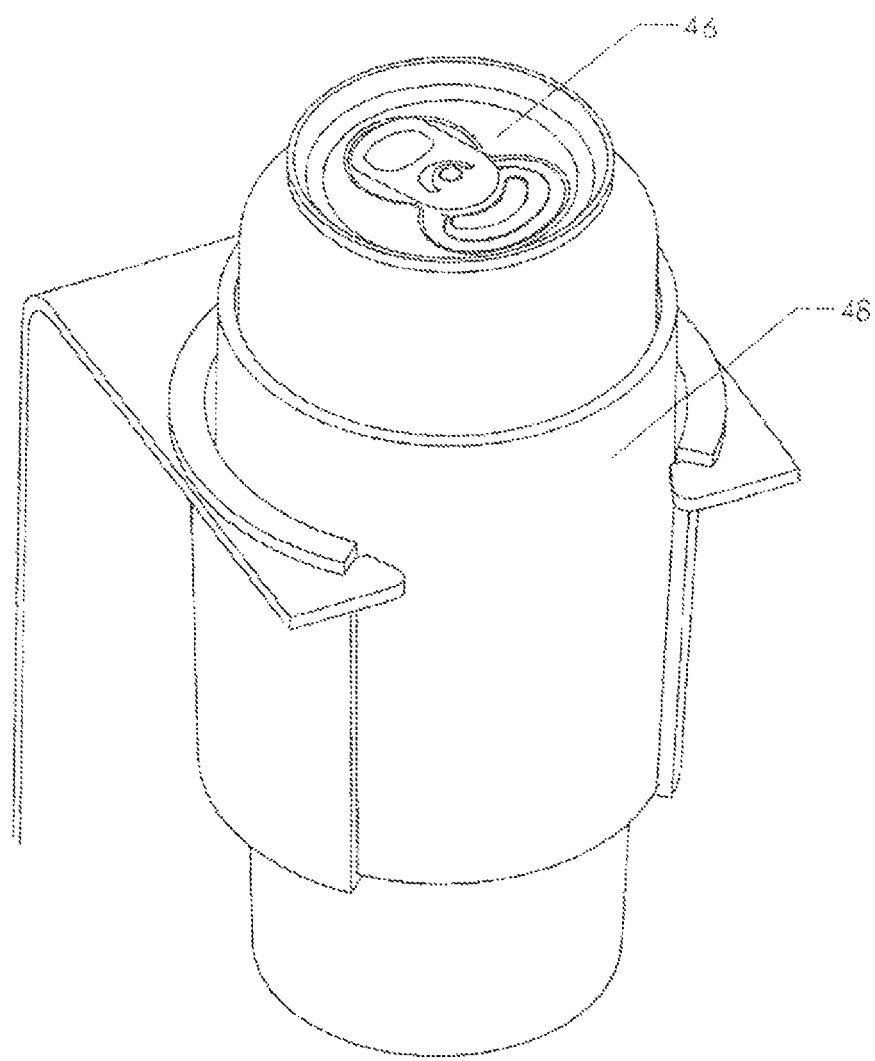
FIG. 7 is a detailed perspective view, showing a can retained by the cup holder.
Figure 8:
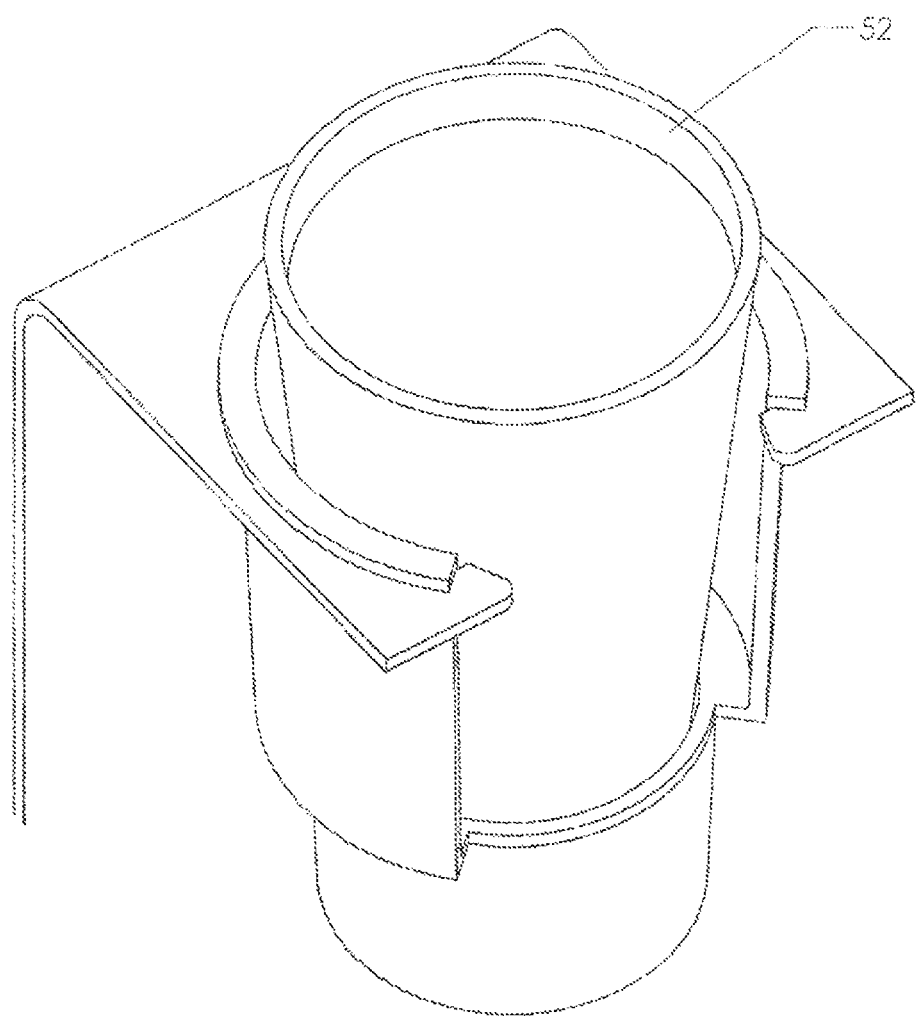
FIG. 8 is a detailed perspective view, showing a tumbler retained by the cup holder.

FIGS. 7 and 8 show how the same cup holder geometry can accommodate different types of beverage containers. FIG. 7 shows an aluminum can 46 surrounded by an insulating jacket 48. This fits within large portion 40 of the sup holder. FIG. 8 shows a large tumbler 52, the base of which is resting within the small portion of the cup holder.

Figure 9:
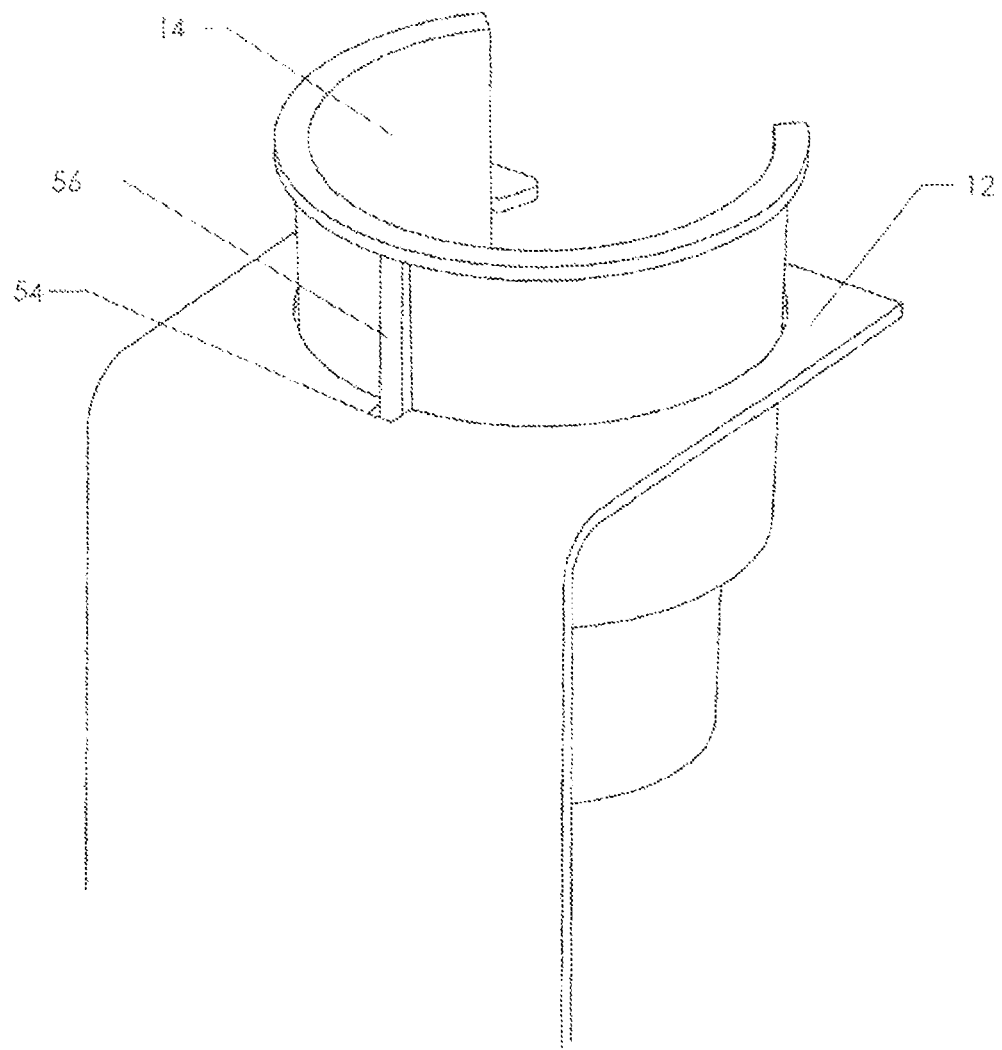
FIG. 9 is a detailed perspective view, showing an alternate embodiment of the cup holder and receiver.

FIG. 9 shows one possible additional embodiment for the preferred rotation-limiting connection between cup holder 14 and receiver 12. The cup holder has been provided with a vertical rib 56 sized to slide into notch 54 in the receiver. This engagement easily prevents rotation while maintaining the desired alignment between the cutouts in the cup holder and the receiver.

The invention can be made using a wide variety of materials and need not be made from any single material. As a first example, the base and upright might be made of stamped metal while the receiver and cup holder could be made of injection molded plastic. Likewise, the entire assembly could be made as one unitary piece.

In many installations of the present invention, base 16 will be secured by placing it beneath the mattress of a bed (such as sliding it between a mattress and box spring). It is advantageous to provide an adjustable overall height for the invention in these and other circumstances, so that the user may place the cupholder at a height that he or she desires. FIGS. 10-21 and 25-30 show embodiments in which the distance between the base and receiver is adjustable.

Figure 10:
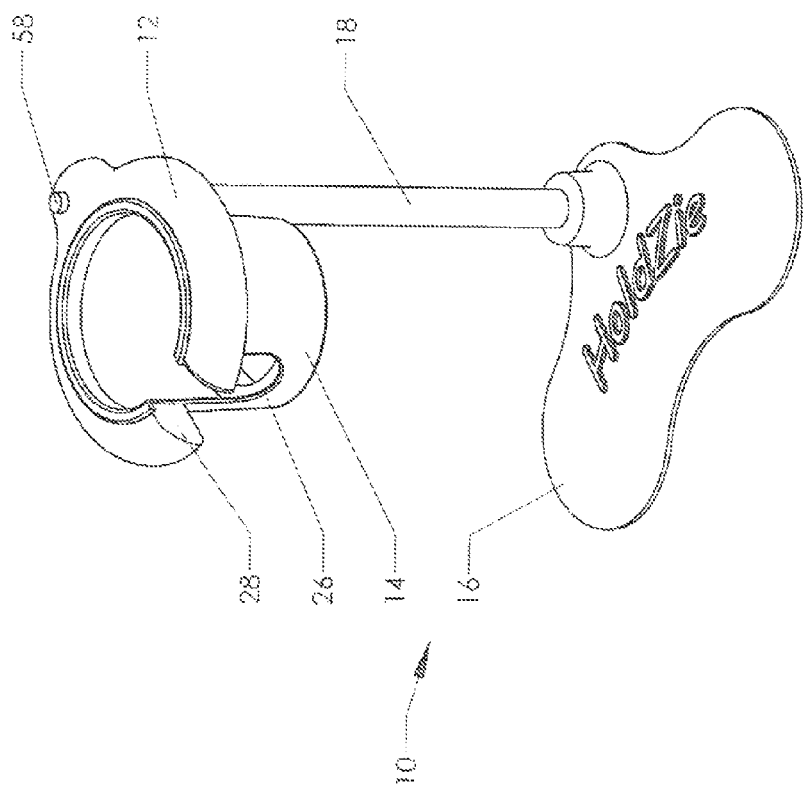
FIG. 10 is a perspective view, showing still another embodiment of the present invention.

FIGS. 10-16 show a first embodiment incorporating a height adjusting feature. In FIG. 10 base 16, upright 18, receiver 12, and cup holder 14 perform the same functions as the embodiments disclosed previously. Receiver 12 preferably includes receiver cutout 28. This feature is designed to align with holder cutout 26 in cup holder 14. However, additional features are provided to allow the adjustment of the height of the device.

The distance between base 16 and receiver 12 is generally fixed when the invention is in use. In order to change the distance in one embodiment, the user presses release button 58. While continuing to press release button 58, the user may grasp receiver 12 and pull it upward or push it downward. The mechanism employed preferably allows these operations using only one hand. For example, the user may press release button 58 with the right thumb while simultaneously hooking the fingers of the right hand under receiver 12 and pulling it upward. When the user releases button 58 the receiver will be locked in position.

Figure 11:
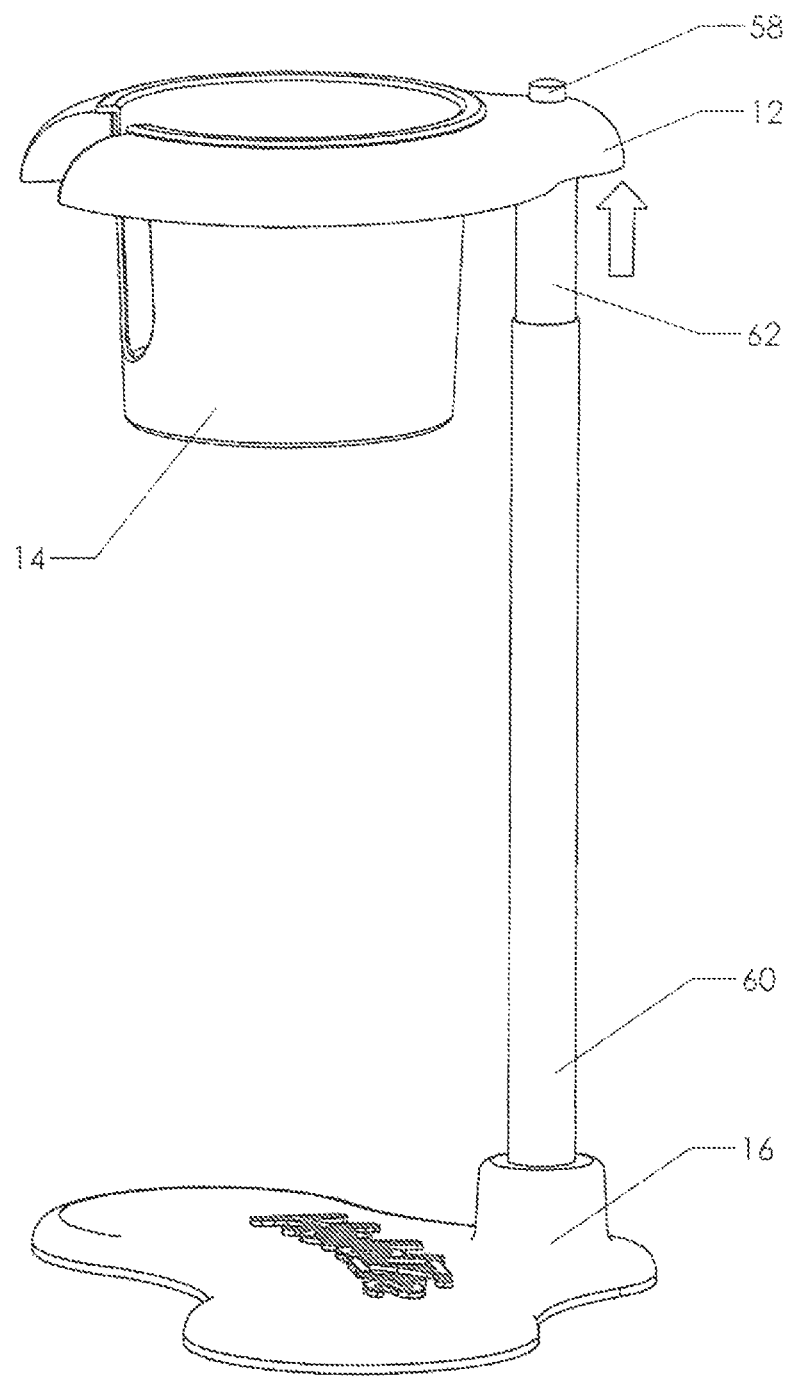
FIG. 11 is a perspective view, showing the height-adjusting feature of the embodiment of FIG. 10.

FIG. 11 graphically illustrates this operation. The upright connecting base 16 to receiver 12 is made of two pieces in this embodiment—base tube 60 and extension slide 62. The base tube is a hollow extruded tube having a uniform cross section. It is connected via a boss to base 16 at its lower end.

In the embodiment shown, extension slide 62 is another hollow tube. The outside diameter of the tube used for extension slide 62 is selected to be a close sliding fit within the inside diameter of base tube 60. FIG. 11 shows how a user can press release button 58 and pull receiver 12 upward. Cup holder 14 and extension slide 62 travel along with receiver 12.

Figure 12:
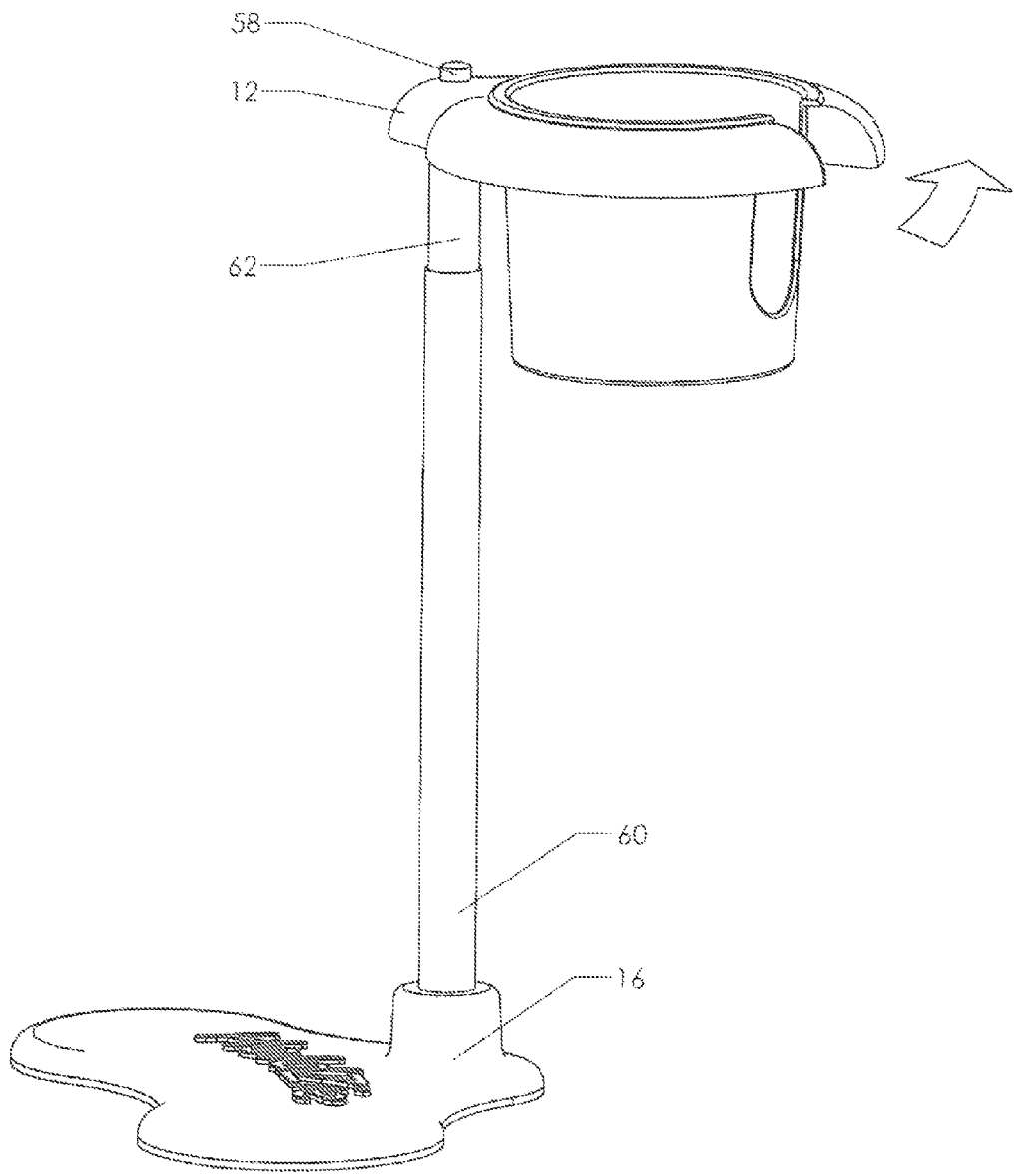
FIG. 12 is a perspective view, showing the rotation-adjusting feature of the embodiment of FIG. 10.

FIG. 12 illustrates how the position of receiver 12 is also rotatably adjustable with respect to base 16 in this particular embodiment. The user is able to grasp receiver 12 and rotate it as indicated by the arrow. Rotation may or may not be locked by the mechanism controlled by release button 58.

Many different locking mechanisms could be employed in the invention and the invention is certainly not limited to any particular mechanism. Nevertheless, the reader may benefit from an explanation of one particularly suitable locking mechanism and—accordingly—this explanation is provided with respect to FIGS. 13-16.

Figure 13:
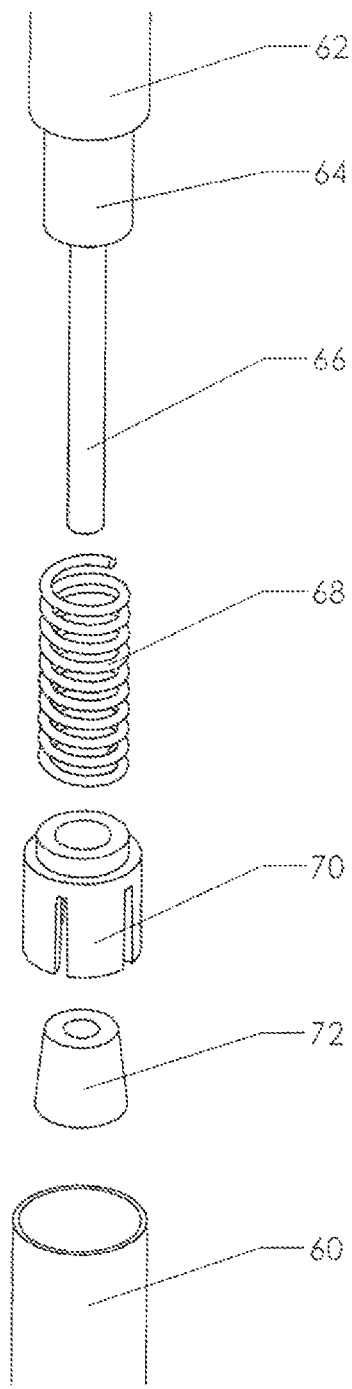
FIG. 13 is an exploded perspective view, showing the components of the locking mechanism used in the embodiment of FIG. 10.

FIG. 13 shows an exploded view of the components used in the locking mechanism. Expanding mandrel 70 is attached to the lower end of extension slide 62. The expanding mandrel and the extension slide slip into the upper end of base tube 60. It extends below the lower portion of extension slide 62 when installed. Expanding mandrel 70 is changeable between a loaded state in which it expands outward and a relaxed state in which it does not. In the loaded state, the expanding mandrel frictionally engages the inner wall of base tube 60 and locks extension slide 62 to base tube 60. In the relaxed state, the expanding mandrel is free to move up and down within the base tube and to rotate.

The other components shown (release rod 64, compression spring 68, and expansion cone 72) are used to control the expanding mandrel. In other words, they selectively change the expanding mandrel between the loaded state and the relaxed state.

Cone shaft 66 is connected to release rod 64. The cone shaft passes through compression spring 68 and expanding mandrel 70 before attaching to expansion cone 72.

Figure 14:
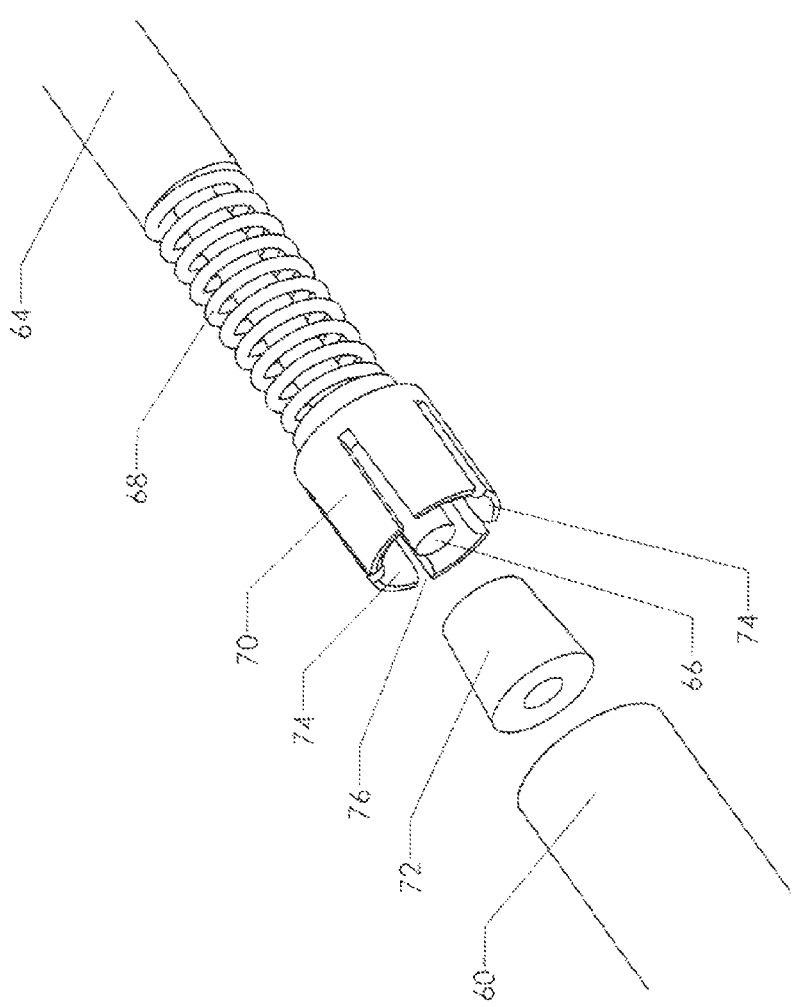
FIG. 14 is an exploded perspective view, showing the components of FIG. 13 in greater detail.

FIG. 14 shows a more detailed view of the same components. The reader will observe that expanding mandrel 70 has four expanding tabs 74. Each expanding tab 74 is separated from its neighbors by a pair of slits 76. The expanding mandrel includes a through-hole along its central axis. This through hole allows the passage of cone shaft 66. Expansion cone 72 attaches to the end of cone shaft 66.

Compression spring 68 is sandwiched between expanding mandrel 70 and a shoulder located on release ro6 64. The compression spring urges the expanding mandrel and release rod apart. In the orientation shown in the view, compression spring 68 urges release rod 64 to the right and expanding mandrel 70 to the left.

Since expansion cone 72 is attached to cone shaft 66, the effect of compression spring 68 is to pull expansion cone 72 up into the hollow interior of expanding mandrel 70. The shape of expansion cone 72 thereby urges expanding tabs 74 outward as it is pulled into the interior of the expanding mandrel.

Figure 15:
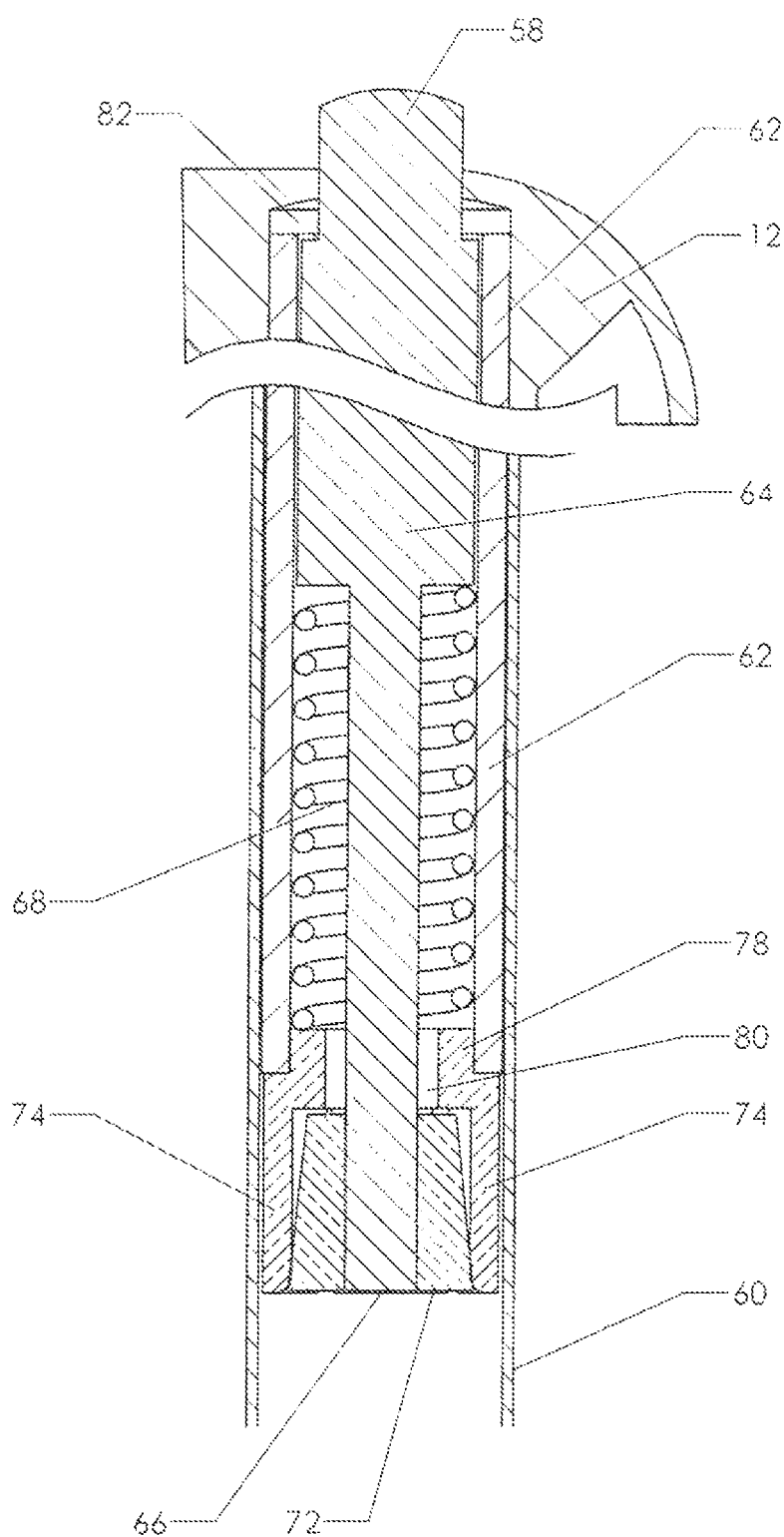
FIG. 15 is a sectional view, showing the locking mechanism components of FIG. 13 in a locked state.
Figure 16:
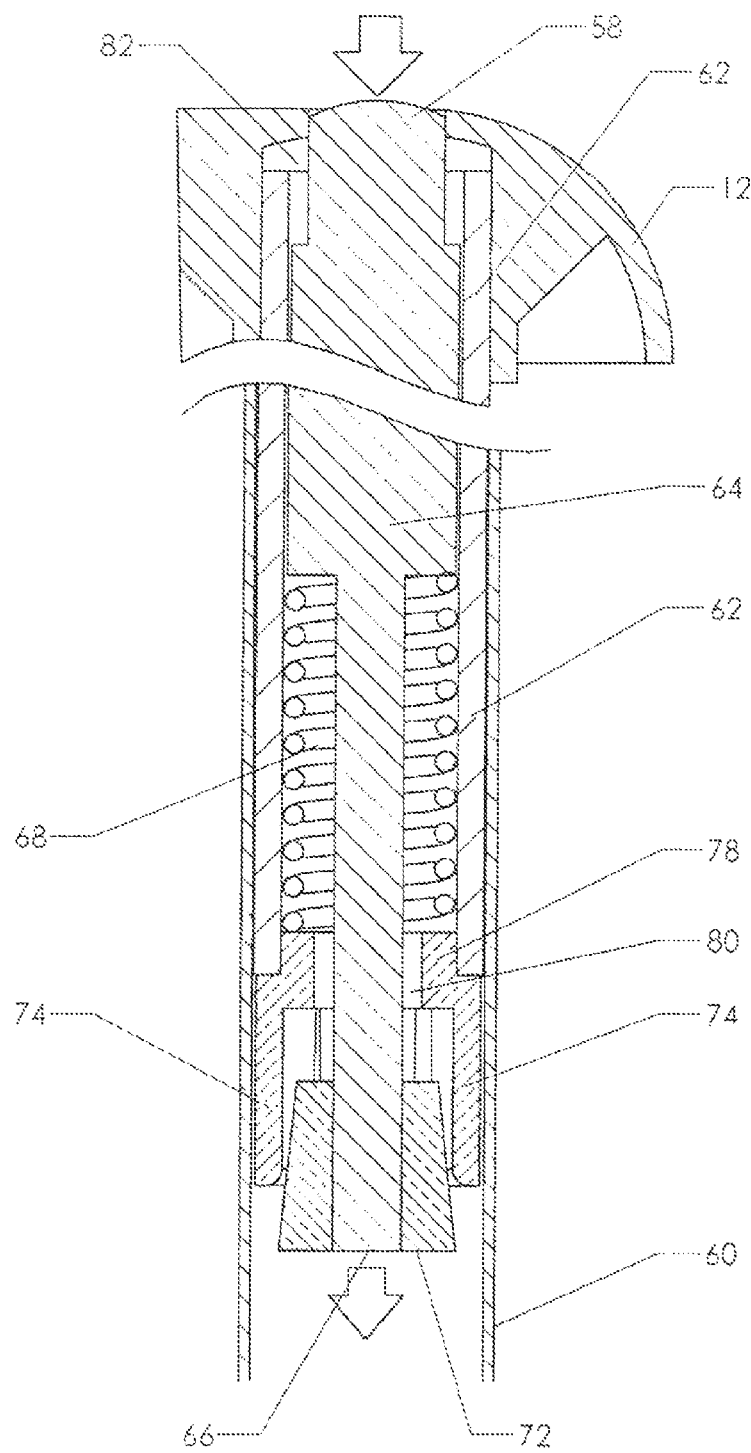
FIG. 16 is a sectional view, showing the locking mechanism components of FIG. 13 in an unlocked state.
Figure 17:
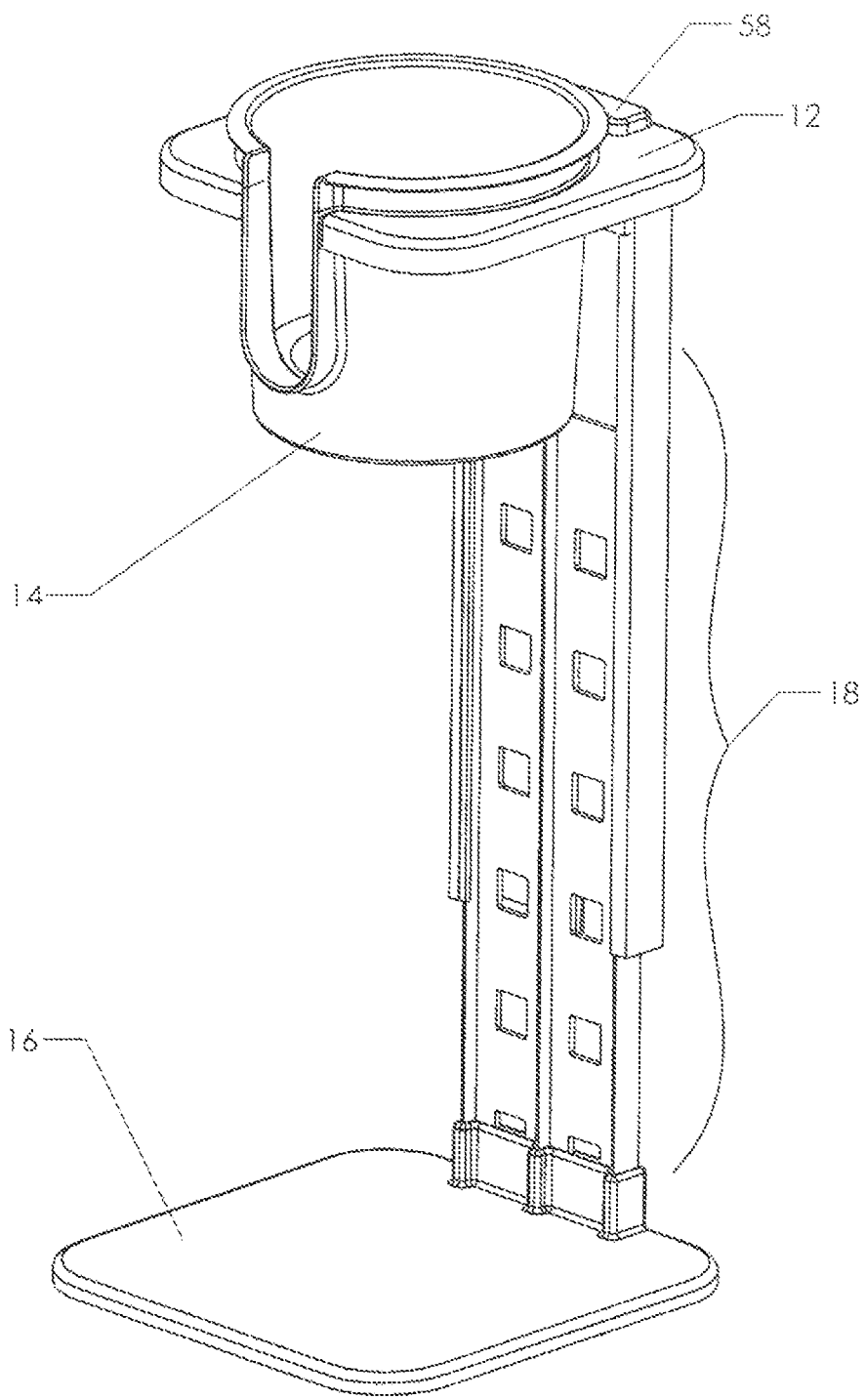
FIG. 17 is a perspective view, showing still another embodiment of the present invention.

FIGS. 15 and 16 show the expanding mandrel in a loaded state and a relaxed state, respectively. In both views, a "break" is shown in the length of extension slide 62 so that the top and bottom portions can be shown in a single view. In FIG. 15, the reader will observe how expanding mandrel 70 is attached to the lower portion of extension slide 62 by virtue of tube shank 78 sliding into the open lower end of extension slide 62 (Recall that in this embodiment the extension slide is simply a hollow tube). The mandrel can be attached to the extension slide using adhesive, a threaded engagement, or any other suitable means. Whatever means is used, the upper portion of the expanding mandrel is connected to the lower portion of extension slide 62.

The expanding mandrel includes a through hole 80 aligned with its central axis. This through hole allows the passage of cone shaft 66. Expansion cone 72 is connected to the free end of cone shaft 66. This connection may again be made by adhesive, a threaded engagement, a cross pin, a circlip, etc. However the connection is made, expanding cone 72 is locked securely to cone shaft 66.

The upper end of the cone shaft is attached to release rod 64, which slides up and down within extension slide 62. Compression spring 68 is sandwiched between the downward facing shoulder on release rod 64 and the upward facing surface of tube shank 78. Expanding mandrel 70 and extension slide 62 are locked together at all times. Thus, compression spring 68 urges release rod upward in the orientation shown in the view. This action urges expansion cone 72 upward. The expansion cone forces expansion tabs 74 outward and causes a strong frictional engagement between the expanding mandrel and the inner wall of base tube 60. The result is that extension slide 62 is locked in position with respect to base tube 60.

The reader will also note that the upper portion of extension tube 62 is attached to receiver 12. A "break" in the view is shown between the lower portion and upper portion of extensions slide 62 and release rod 64. The break is included so that the upper and lower portions of these components can be shown in the same view at a scale that is large enough to depict the relevant details.

The attachment between the upper portion of extension slide 62 and receiver 12 may again be made by any suitable means, including a press fit, a threaded engagement, an engagement based on adhesive, etc. However the connection is made, extension slide 62 and receiver 12 are locked together.

The upper portion of release rod 64 is also shown in the upper part of FIG. 15. The very top of release rod 64 includes release button 58. Receiver 12 preferably includes a retainer 82 surrounding release button 58. Without the retainer, compression spring 68 would push release rod 64 up and out the top of the receiver. The retainer keeps release rod 64 in the position shown. The retainer is shown as an integral feature of receiver 12 but may of course be a separate feature that is added during the assembly process. It is also possible to omit the retainer altogether, since the interaction of expansion cone 72 and expanding mandrel 70 limits the upward travel of release rod 64.

FIG. 15 shows expanding mandrel 70 in a "loaded" state. Compression spring 68 is urging expansion cone 70 up into the mandrel and forcing expanding tabs 74 outward. The expanding tabs create a strong frictional engagement with the inward facing wall of base tube 60. This locks the extension slide and the components attached thereto (receiver 12 and cupholder 14) in position.

FIG. 16 shows the locking mechanism in a "relaxed" state. The user has pressed down on release button 58 as indicated by the arrow. This motion pushes release rod 64 downward and pushes expansion cone 72 out of expanding mandrel 70 (while also further compressing compression spring 68). Expanding tabs 74 relax inward and are then able to freely slide along the inner wall of base tube 60. Extension slide 62 is free to slide up and down and to rotate.

Significantly, the mechanism shown allows the user to adjust the position of the receiver 12 using only one hand. Returning to FIG. 11, those skilled in the art will realize that the user may—using a single hand—depress release button 58 and grasp receiver 12. While holding the release button down, the user can pull the receiver up or push it down. The user can also rotate the receiver as shown in FIG. 12. When the user lets go of the release button, the receiver will be locked in position. Thus, the user may adjust the position of the receiver as desired by pressing the release button, moving the receiver to a desired position, and releasing the release button. This feature creates a "selectable separation distance" between receiver 12 and base 16, which is limited only by the length of base tube 60 and extension slide 62.

Figure 18:
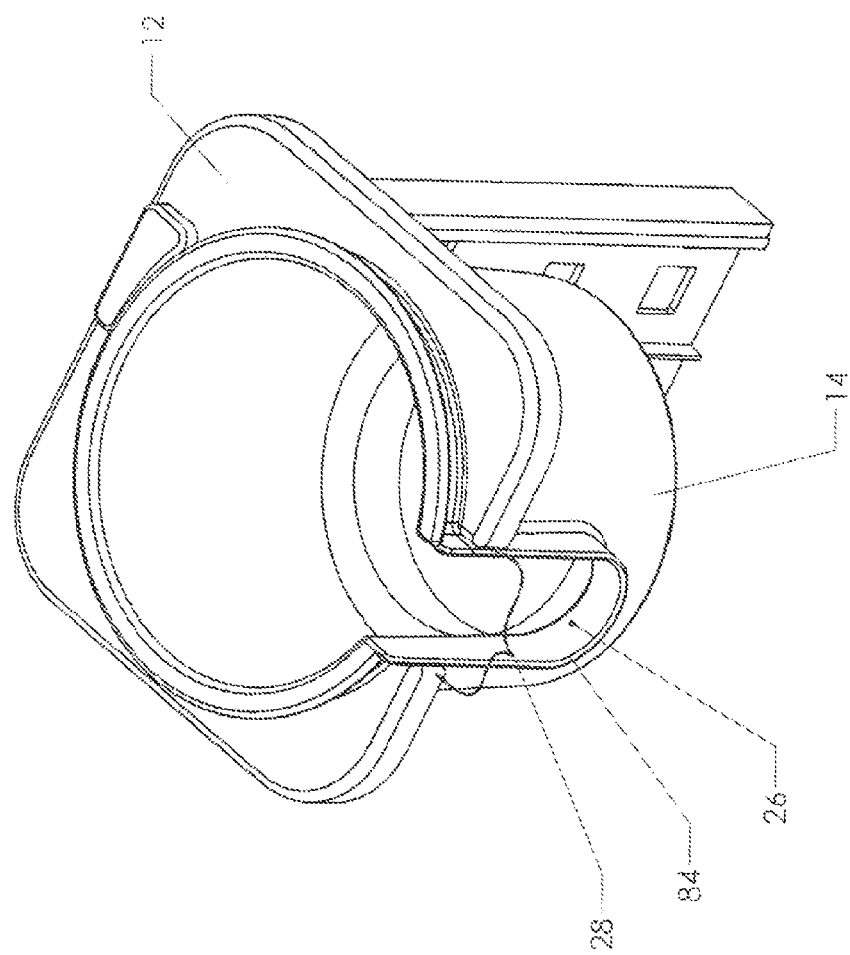
FIG. 18 is a detailed perspective view, showing the receiver and cup holder of the embodiment of FIG. 17.

FIGS. 17-21 show still another embodiment incorporating a different type of adjustment mechanism. FIG. 18 shows how the same major components are included—base 16, upright 18, receiver 12, cup holder 14, and release button 58. FIG. 18 shows more detail of receiver 12 and cup holder 14. In the particular embodiment of cup holder 14 shown, holder cutout 26 is preferably aligned with receiver cutout 28. Holder cutout 26 incorporates a cutout flange 84 surrounding its perimeter. This cutout flange extends outward and bears against the two sides of receiver cutout 28, thus preventing the rotation of cup holder 14 with respect to receiver 12.

Figure 19:
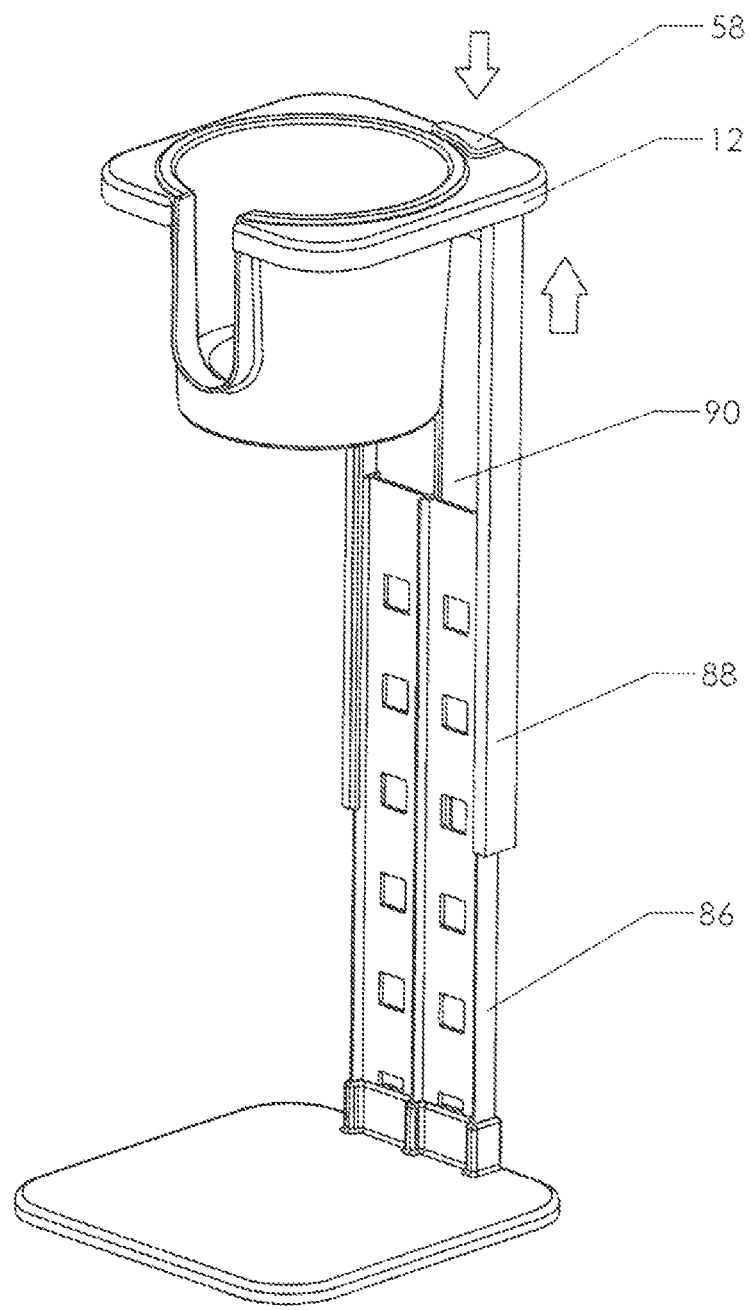
FIG. 19 is a perspective view, showing the height-adjusting feature of the embodiment of FIG. 17.

FIG. 19 illustrates the adjustment features of this embodiment. Ladder frame 86 extends upward from the base. Extension slide 88 is a sliding fit on the ladder frame. Actuator 90 is moved by release button 58. When the release button is pressed in with respect to receiver 12, the user is able to move extension slide 88 and up and down with respect to the ladder frame. When the user releases the release button, extension slide 88 is locked into the nearest available position on the ladder frame.

Figure 20:
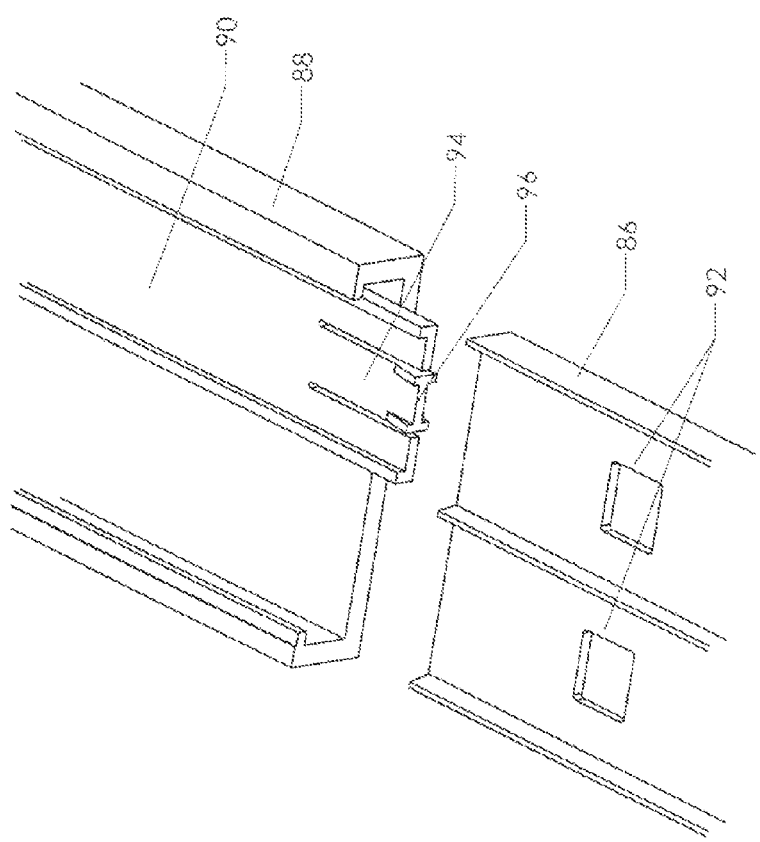
FIG. 20 is an exploded perspective view, showing the components used in the locking mechanism of the embodiment of FIG. 17.

FIG. 20 shows more details of ladder frame 86, extension slide 88, and actuator 90. The reader will note that the ladder frame has a series of transverse windows 92. The lower portion of actuator 90 includes flex tang 94. The lower portion of flex tang 94 includes protrusions 96 facing toward the viewer in the view and additional protrusions 96 facing away from the viewer.

When the release button is depressed, actuator 90 moves down with respect to extension slide 88, and the end of flex tang 94 extends past the end of the extension slide, as shown in FIG. 20. In this configuration flex tang 94 is free to deflect away from the viewer. This deflection allows the upward facing protrusions 96 to pop in and out of successive windows 92 as extension slide 88 slides with respect to the ladder frame.

However, when the user lets go of the release button, actuator 90 translates upward with respect to extension slide 88 until the lower end of the actuator is roughly even with the lower end of the extension slide. In that position, the rearward facing protrusions 96 bear against the inner wall of actuator 90 and force flex tang 94 to deflect upward. This causes the flex tang to "pop" into the next window 92 it passes. Once the flex tang pops into a window, extension slide 88 is locked in position until the release button is again actuated.

Figure 21:
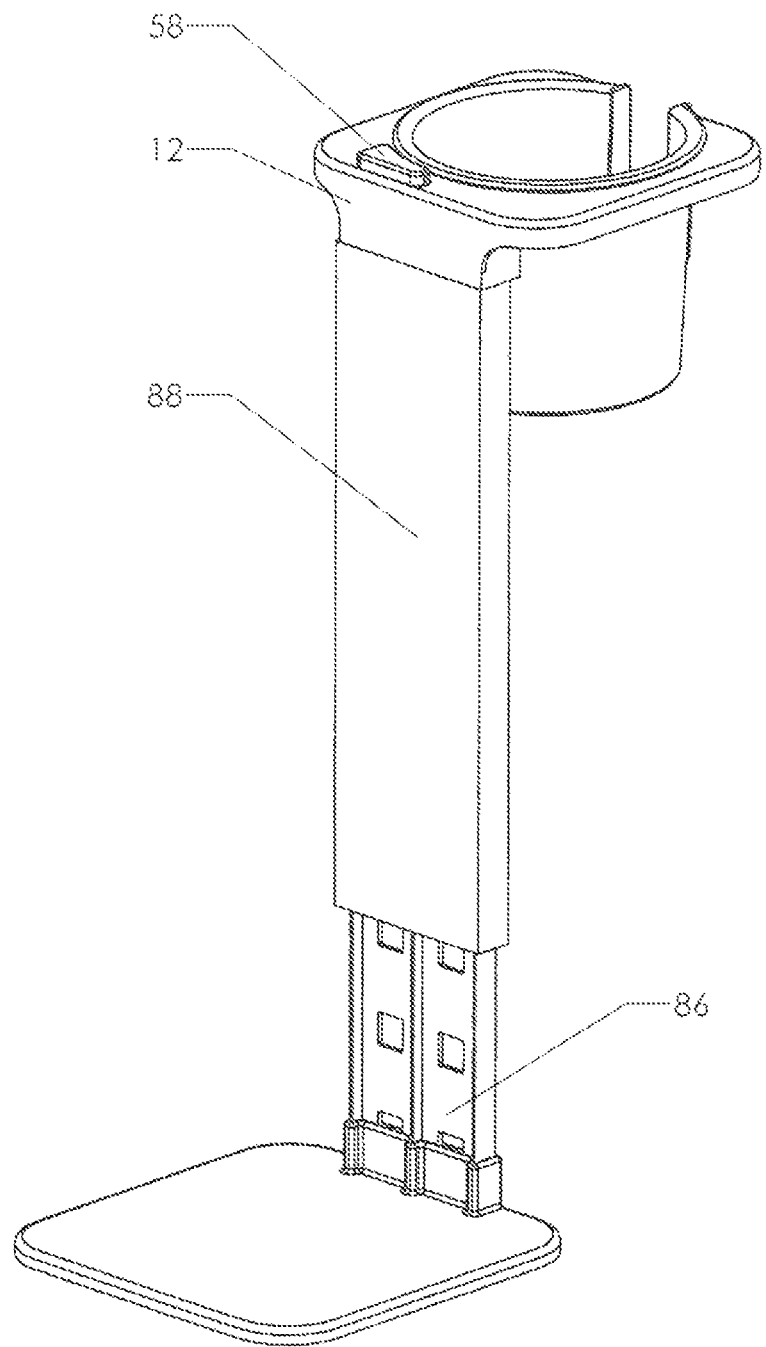
FIG. 21 is a perspective view, showing the rotation-adjusting feature of the embodiment of FIG. 17.

The reader will note in FIG. 20 that two vertical sets of release windows 92 are provided on the ladder frame. These allow the extension slide and its related hardware to be reversible on the ladder frame. The user can depress the release button, pull extension slide 88 completely clear of the ladder frame, rotate the extension slide 180 degrees, and reinstall it. This configuration is shown in FIG. 21. Thus, the embodiment provides a rotation adjusting feature for the receiver, though it is only possible to place it in two angular positions (0 degrees and 180 degrees).

Figure 22:
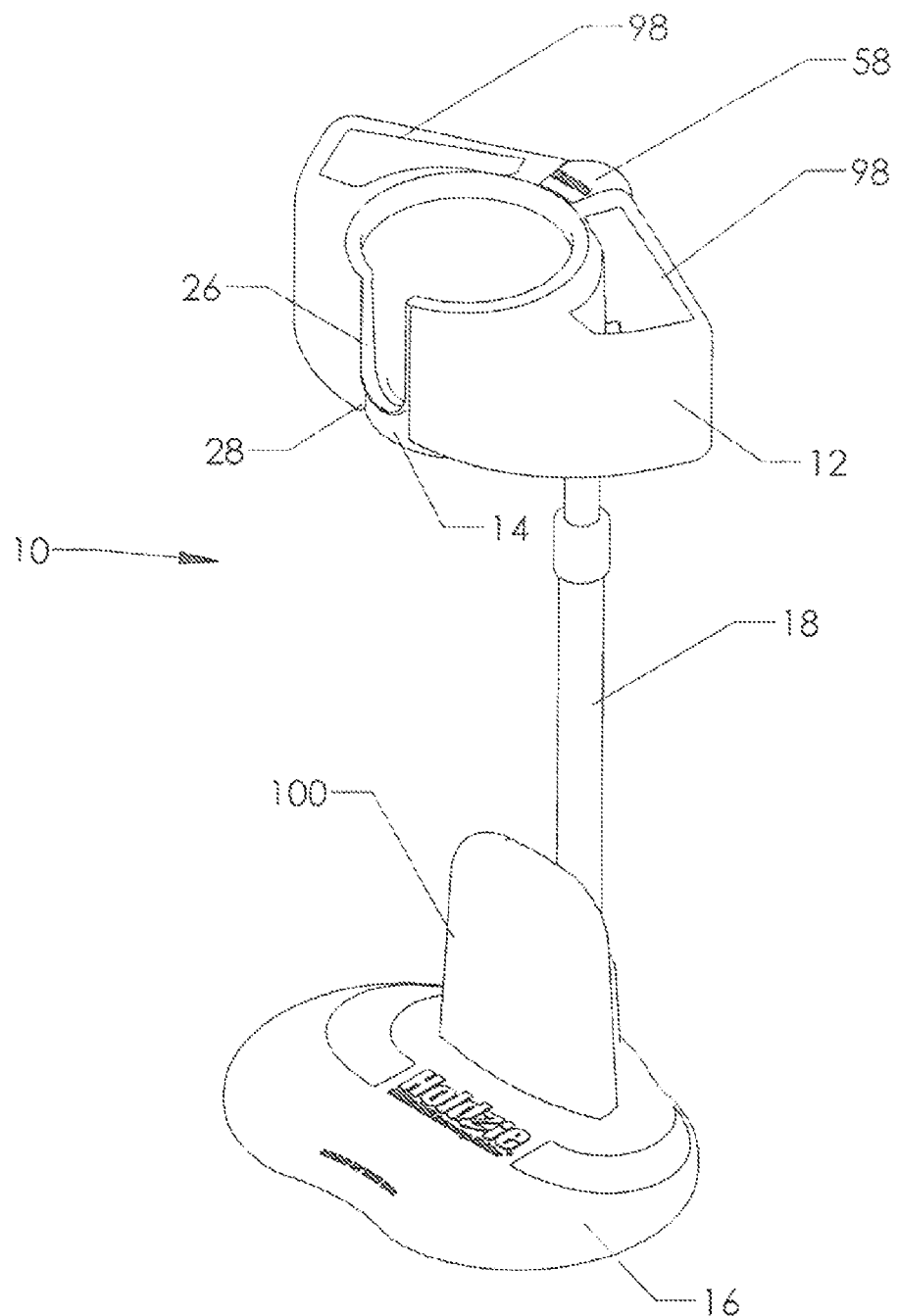
FIG. 22 is a perspective view, showing an alternate embodiment of the present invention.

FIG. 22 shows yet another embodiment of the present invention. Object-holding stand 10 includes the primary components described in the embodiments shown in FIGS. 1-21—base 16, receiver 12, cup holder 14, upright 18, holder cutout 26, and receiver cutout 28. FIG. 22 comprises the same basic structure of the invention as the previous embodiments described. In addition, the embodiment shown in FIG. 22 includes many of the additional features shown in FIGS. 10-16. These features provide the functionality of adjusting the height of object-holding stand 10 and rotating receiver 12, as shown in FIGS. 11-12.

While object stand 10 includes all of the components discussed in the previous text, the embodiment in FIG. 22 also includes additional features. Receiver 12 includes at least one receptacle 98. Receptacle 98 provides an opening in receiver 12. Preferably, the opening is located horizontally level with the top surface of receiver 12. Receptacle 98 includes a bottom surface and 4 side surfaces, thereby creating a pocket. The user can, then, place objects in receptacle 98 in order to hold or store the objects.

In one embodiment of the current invention, there are two receptacles 98. Each receptacle 98 is preferably designed to fit a multitude of objects. The reader will understand that the user can place many objects in receptacles 98 including a cellular phone, a reading tablet, a book, a television (or any other) remote control, a portable music player, or any object that may fit. Preferably, receptacles 98 do not interfere with holder cutout 26 and receiver cutout 28. For instance, receptacles 98 can be placed on the opposite end of receiver cutout 28, proximate push button 58.

Although two receptacles 98 are shown, the reader should note that there are a number of possible configurations for receptacle 98. For example, receptacle 98 can be extended in the direction away from cup holder 14, thereby increasing the width of receptacle 98. Ultimately, receptacle 98 can take many other forms than shape and size presented here.

Another feature of the embodiment shown in FIG. 22 is support 100. Support 100 increases the stability of object-holding stand 10. This is especially true when base 16 is placed between a mattress and box spring (as shown in FIG. 2). While in this configuration, support 100 is pressed firmly against the side of a mattress, which limits the movement of object-holding stand 10. Preferably, the height of support 100 is approximately the thickness of a typical mattress.

Figure 23:
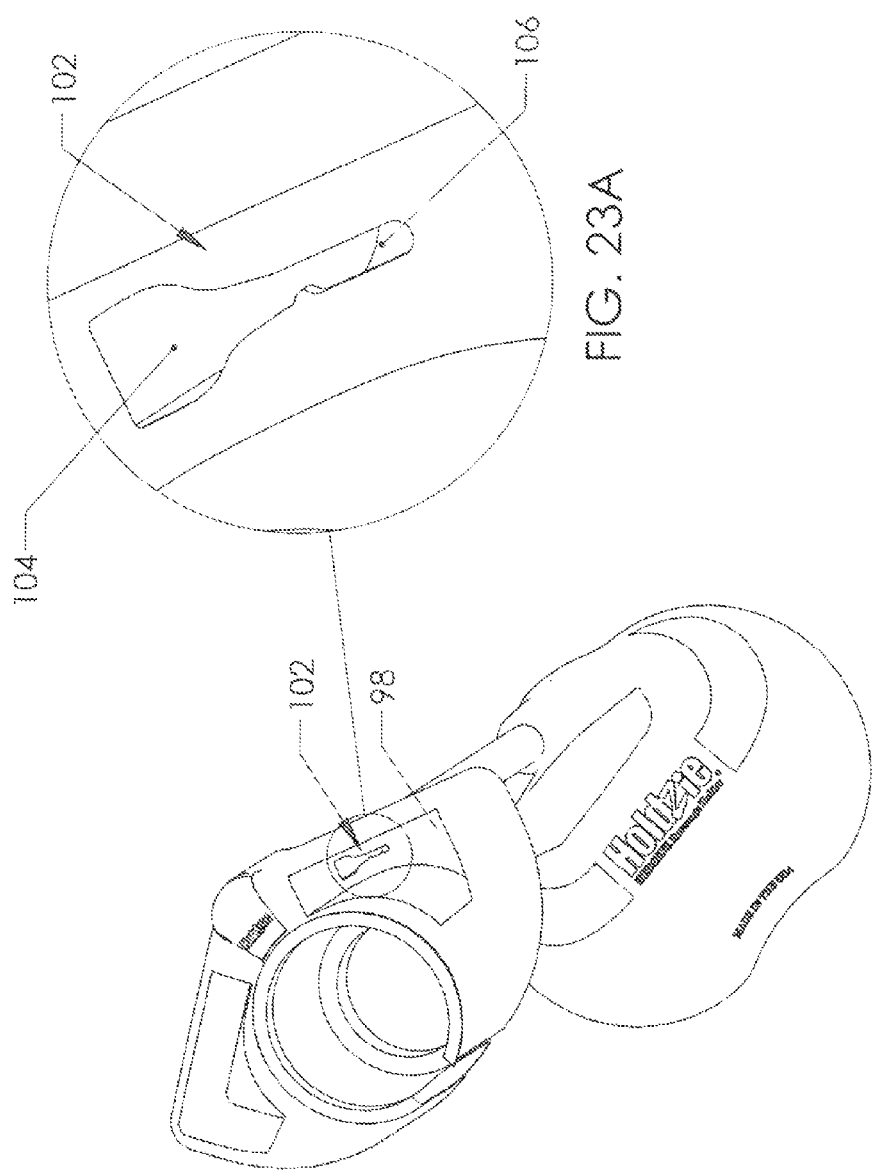
FIG. 23 is a perspective view, showing the cord securing feature of the embodiment of FIG. 22.

FIGS. 23 and 23A show additional details of receptacle 98. Preferably, the bottom surface of receptacle 98 includes receptacle slot 102. In an even more preferred embodiment, receptacle slot 102 contains large area 104 and small area 106. Receptacle slot 102 is designed to accommodate a cord and a plug that can be used to charge an electronic device (cellular phone, tablet, portable media player, etc.).

Figure 24:
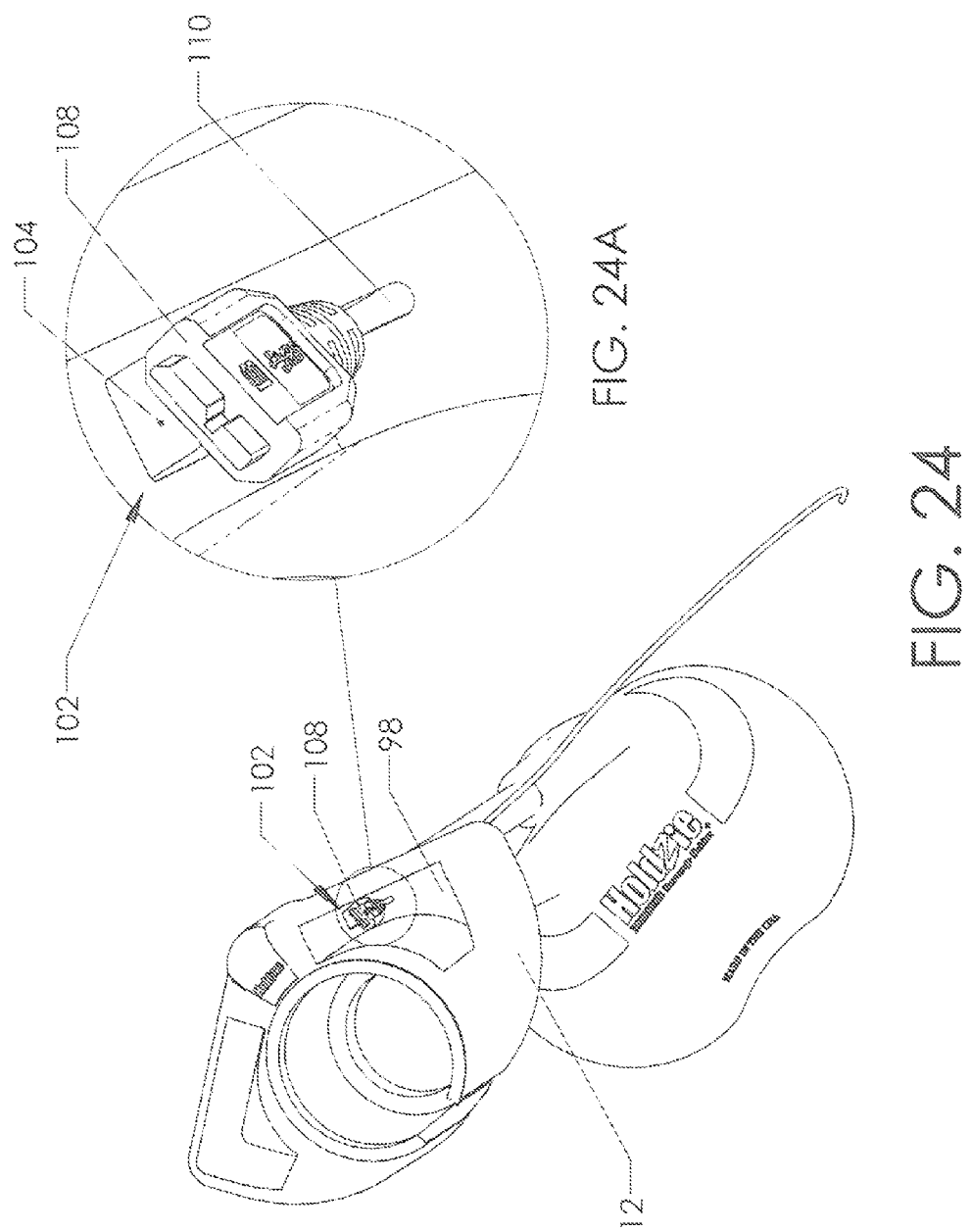
FIG. 24 is a perspective view, showing an electronic device charger placed in the cord securing feature of the embodiment of FIG. 22.

FIGS. 24 and 24A show an electronic device charger within receptacle 98. Preferably, plug 108 can fit through large area 104 of receptacle slot 102. In order to keep plug 108 within receptacle 98, the user can slide cord 110 over into small area 106 of receptacle slot 102. The cross sectional area of plug 108 is large enough to ensure plug 108 and cord 110 do not fall through receptacle slot 102. This allows the user to charge an electronic device while it rests in receptacle 98 with little concern of plug 108 falling through receptacle slot 102.

Although FIGS. 24 and 24A show plug 108 and cord 110 as separate components from receiver 12, it is possible to provide plug 108 and cord 110 as integral to receiver 12. In this alternate embodiment, the wire for the charger is attached to upright 18. This keeps cord 110 stowed and out of the way of the user. Preferably, plug 108 receives power either by battery pack in base 16 or by means of wall outlet. In one configuration, plug 108 is specifically chosen for a type of cellular phone or tablet. However, in a preferred embodiment of the present invention, plug 108 is a standard USB plug. In order to charge a cellular phone or other electronic device, the user can plug in different adaptors for different devices. This is especially useful because the majority of cellular phones, tablets, and portable music players use one of two plugs—an iPhone® type charger plug or a micro-USB type charger plug. It should be noted that other options for plug choice are available, but the most universal choices are discussed.

One embodiment of the present invention is shown in FIGS. 25-28. This particular embodiment includes receiver 12, base 16, and support 100. However, receiver 12 does not include a cup holder or a cup holder relief as it does in previous embodiments. Each of the variations of this embodiment includes one or more receptacles 98 in which a user may place any number of objects, as discussed further in the subsequent text.

Figure 25:
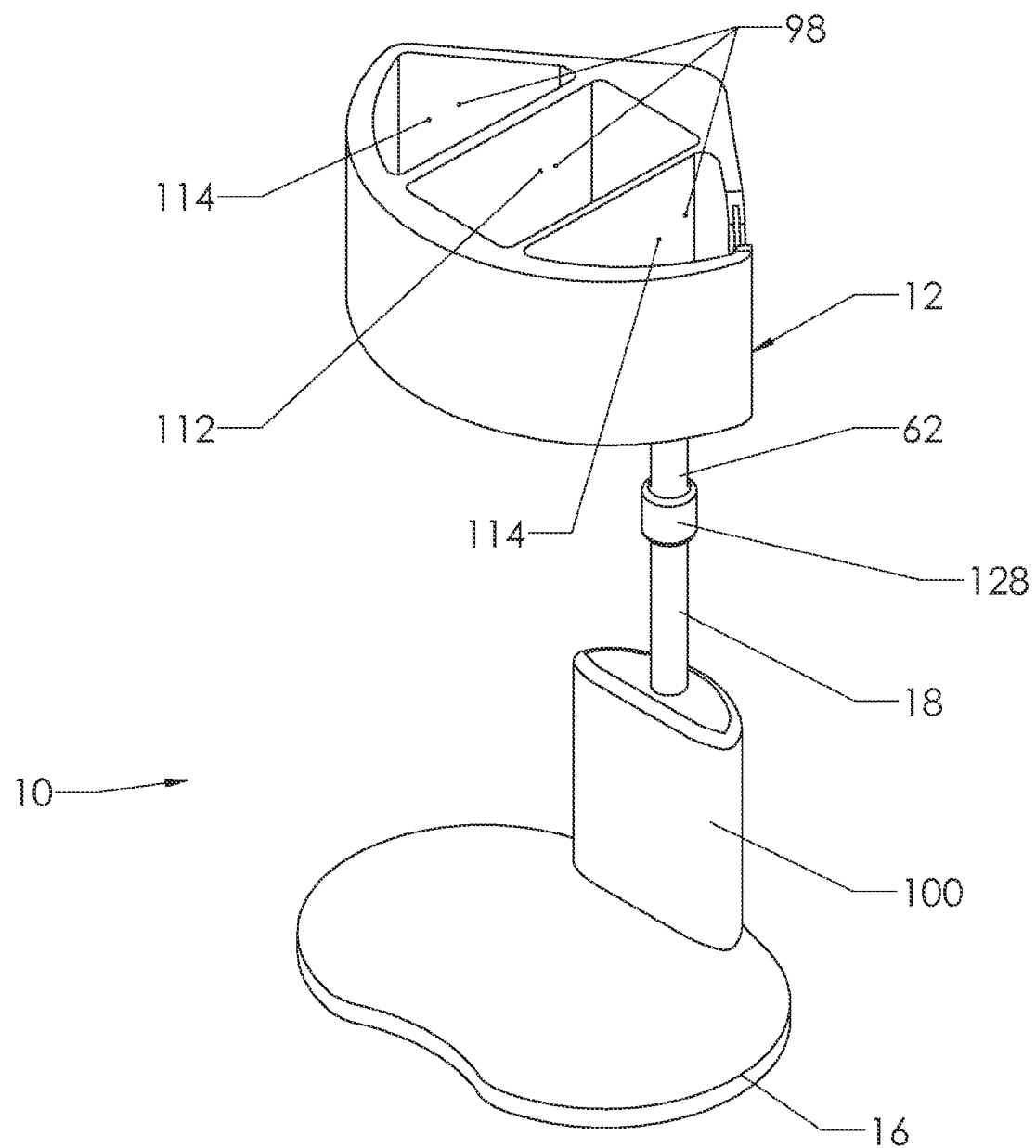
FIG. 25 is a perspective view, showing an embodiment of the present invention.
Figure 31:
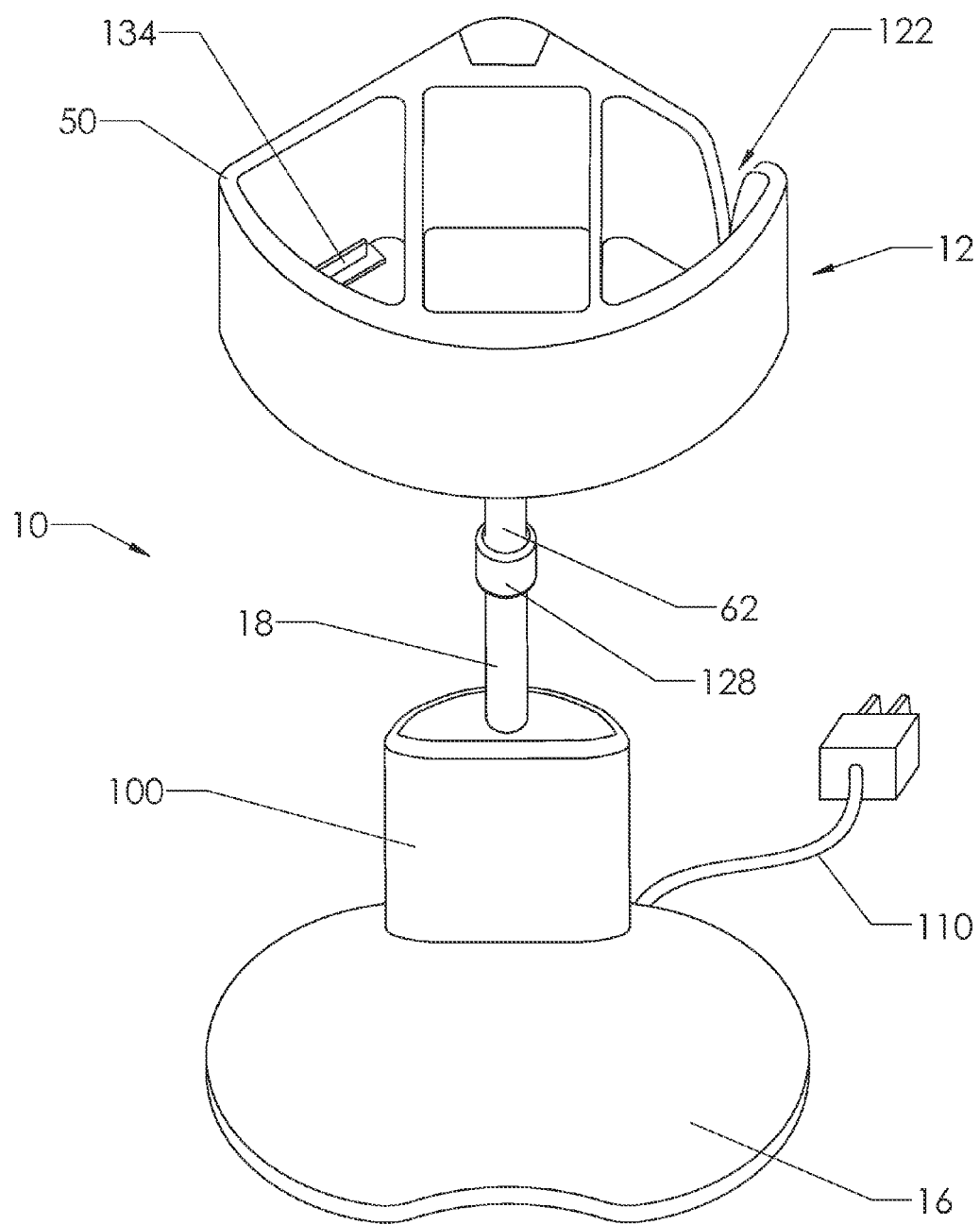
FIG. 31 is a perspective view, showing an integrated plug and a charging dock within the receptacle.

The embodiment illustrated in FIG. 25 shows object-holding stand 10, which includes three receptacles 98 within receiver 12. There is a large, centrally located receptacle 112 and two secondary receptacles 114 on either side. Similar to the embodiments shown in FIGS. 23-24, centrally located receptacle 112 or secondary receptacles 114 may include a slot or cord (not shown in this figure) in order to charge a mobile electronic device such as a cellular phone, tablet, or electronic book reader. Additionally, receptacles (112, 114) may include a charging dock 134 or USB port for convenience, as illustrated in FIG. 31. In such an embodiment, electrical wiring could run through the stand 10 such that a cord 110 could conveniently extend from the base 16 or support 100 away from the stand 10 to plug into a conventional outlet. Preferably, centrally located receptacle 112 is large enough that objects such as magazines, books, large tablets, and other objects.

Figure 26:
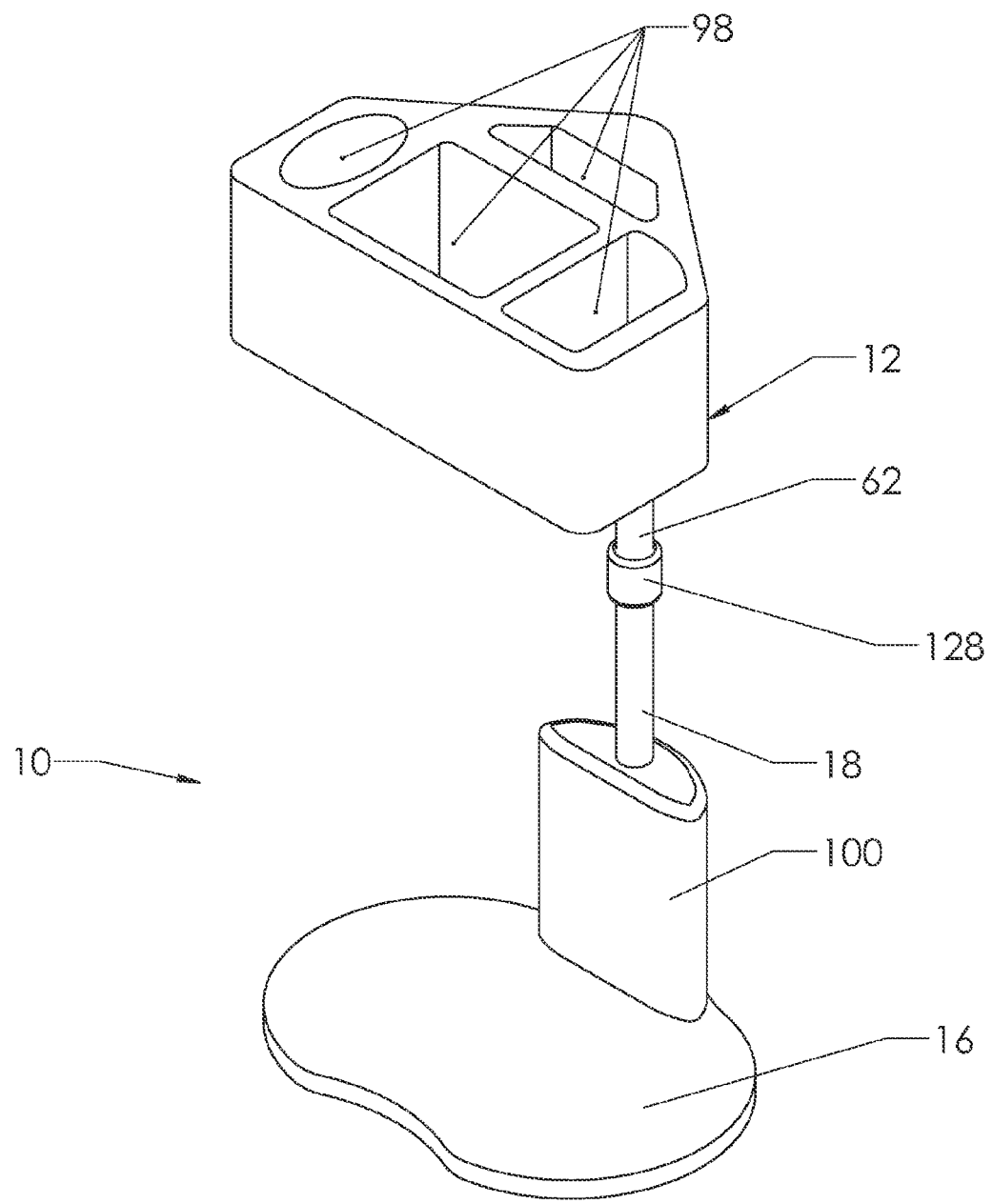
FIG. 26 is a perspective view, showing an embodiment of the present invention.
Figure 27:
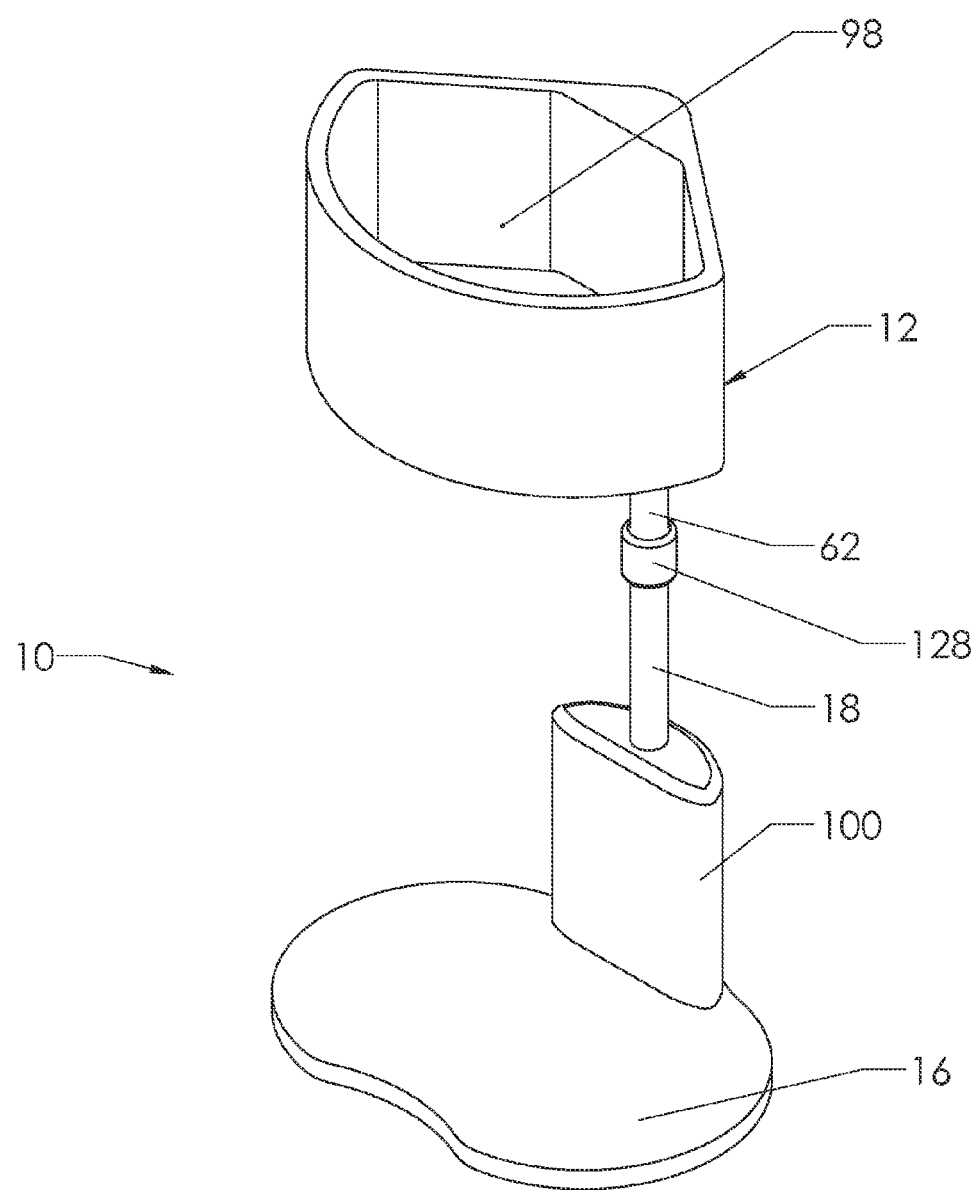
FIG. 27 is a perspective view, showing an embodiment of the present invention.

FIG. 26 shows another embodiment wherein receptacles 98 are shaped and sized differently for different objects. The reader will note that receptacles 98 can be fabricated in many sizes and shapes. The embodiment illustrated shows that receptacles 98 should not be limited to any particular size or shape and it may be desirable for the user to have many receptacles 98 in order to separate objects placed in the receptacles 98. Receptacles 98 are formed from receiver 12. Receiver 12 is connected to extension slide 62 which is slidably connected to upright 18. The reader will appreciate that a user can twist extension slide 62 and upright 18 with respect to one another and lengthen or shorten the height at which receiver 12 sits. Once the desired height is reached the user can twist extension slide 62 and upright 18 with respect to one another to lock the mechanism in place. Locking mechanism 128 acts to maintain the desired height and is the point at which the extension slide 62 and upright 18 twist together. Upright 18 is connected to support 100, which is mounted to base 16, so as to provide a strong support for object-holding stand 10. FIG. 27 shows yet another embodiment of the present invention. As illustrated, receiver 12 includes only one large centrally located receptacle 98. This allows the user to place larger objects into receptacle 98 without increasing the size of receiver 12.

Figure 28:
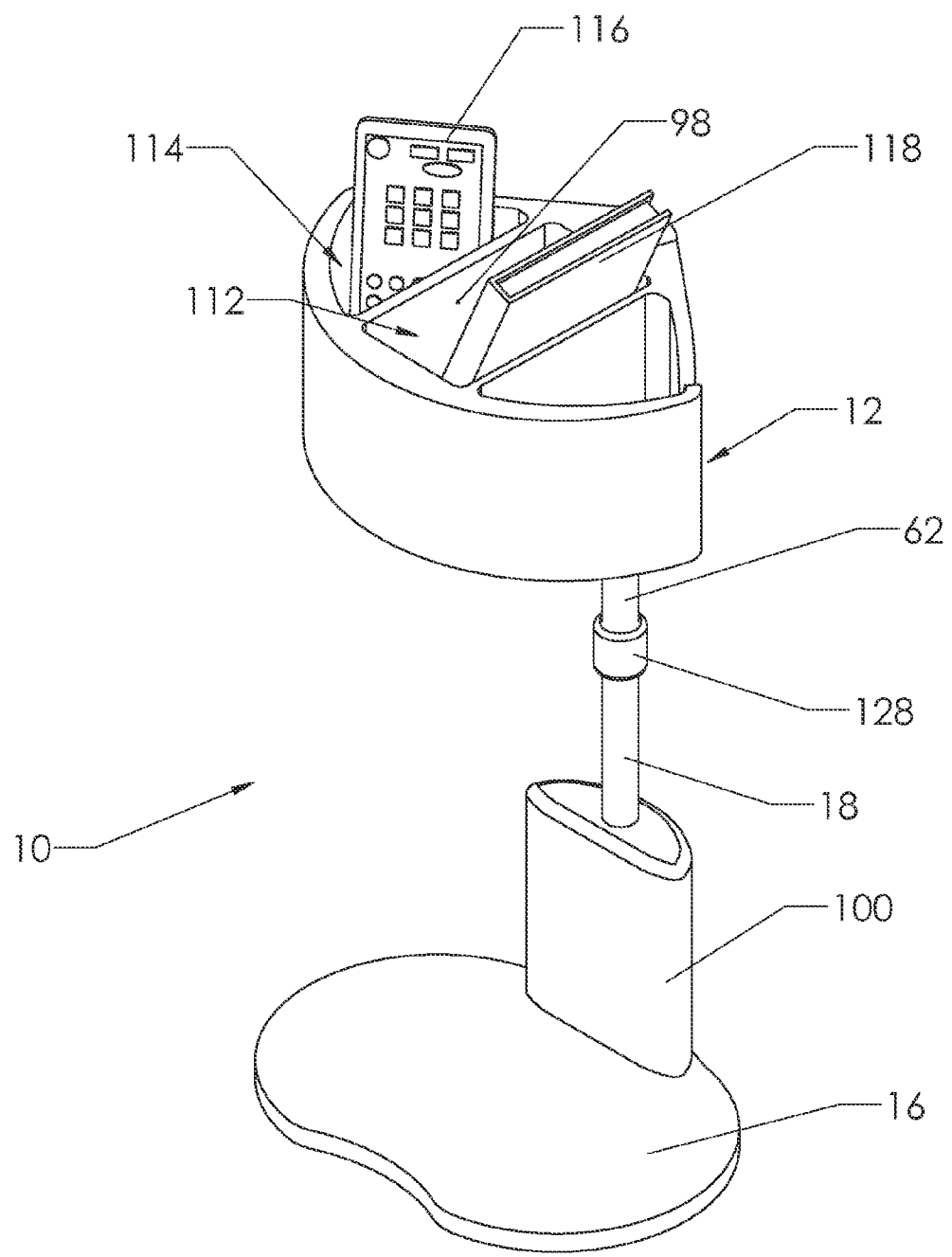
FIG. 28 is a perspective view, showing the embodiment of FIG. 25 with a remote control and book placed in the receptacle.

FIG. 28 shows the embodiment of FIG. 25 with objects inserted into receptacle 98. An object 116 (such as a remote control for a television) is shown resting within secondary receptacle 114. In addition, an object 118 (such as a book) is shown resting within central receptacle 112. The reader will note that while a book and a remote control are shown in receptacles 98, there are many objects which can be placed into receptacles 98. These two objects are shown only to illustrate some of the many objects which can be placed into receptacles 98.

Figure 29:
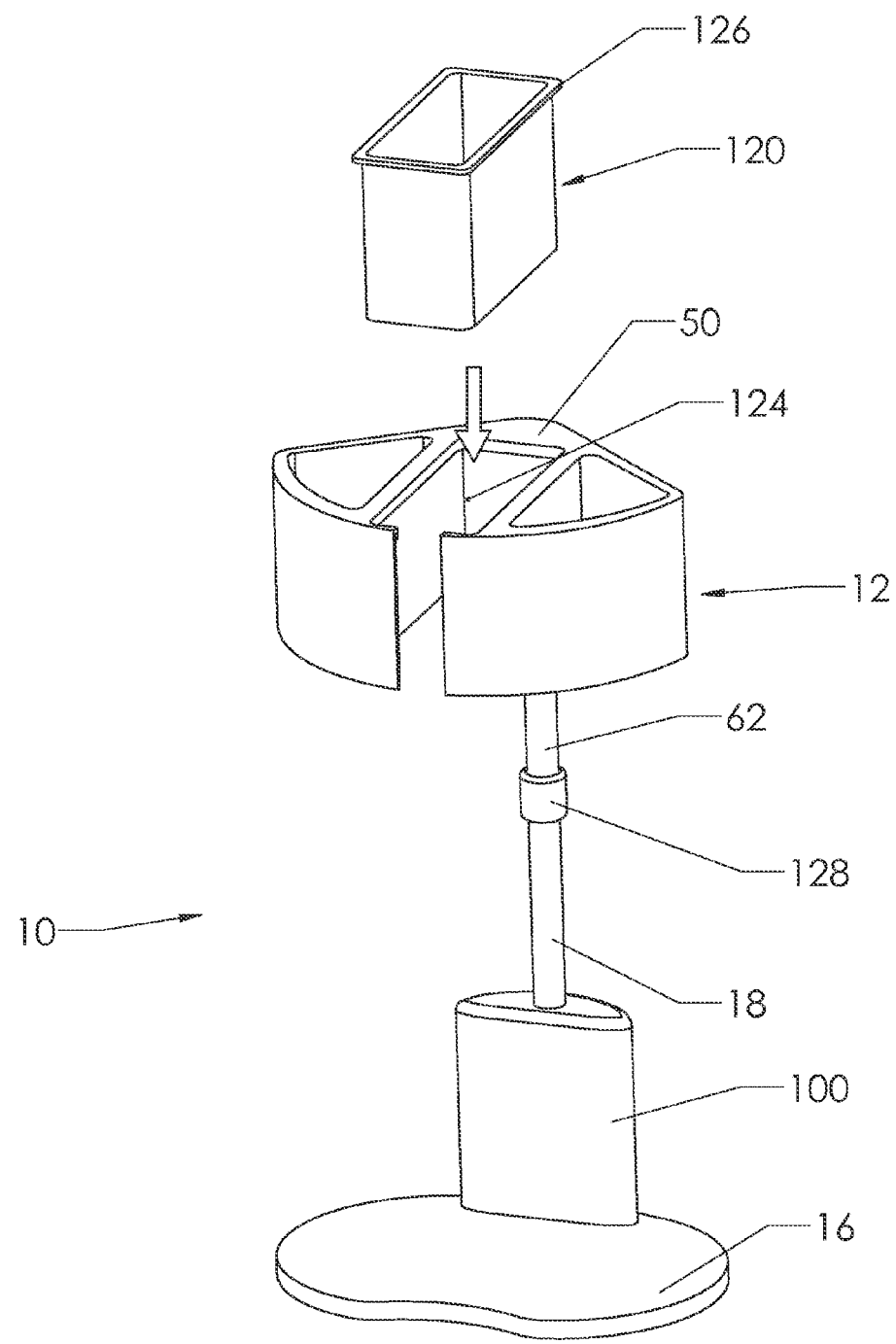
FIG. 29 is a perspective view, showing a removable receptacle as it is inserted into the receiver.

FIG. 29 shows an embodiment of the present invention wherein receiver 12 includes receiver relief 124. Receiver relief 124 is preferably fabricated in order to fit removable receptacle 120. Preferably, removable receptacle 120 is inserted into receiver relief 124. In order to prevent removable receptacle 120 from falling through receiver relief 124, removable receptacle 120 includes lip 126. Preferably, lip 126 rests against upper surface 50 of receiver 12. This allows removable receptacle 120 to remain within receiver relief 124. The discussion regarding this engagement is brief due to the fact that this engagement is nearly identical to the engagement discussed in FIG. 5.

Figure 30:
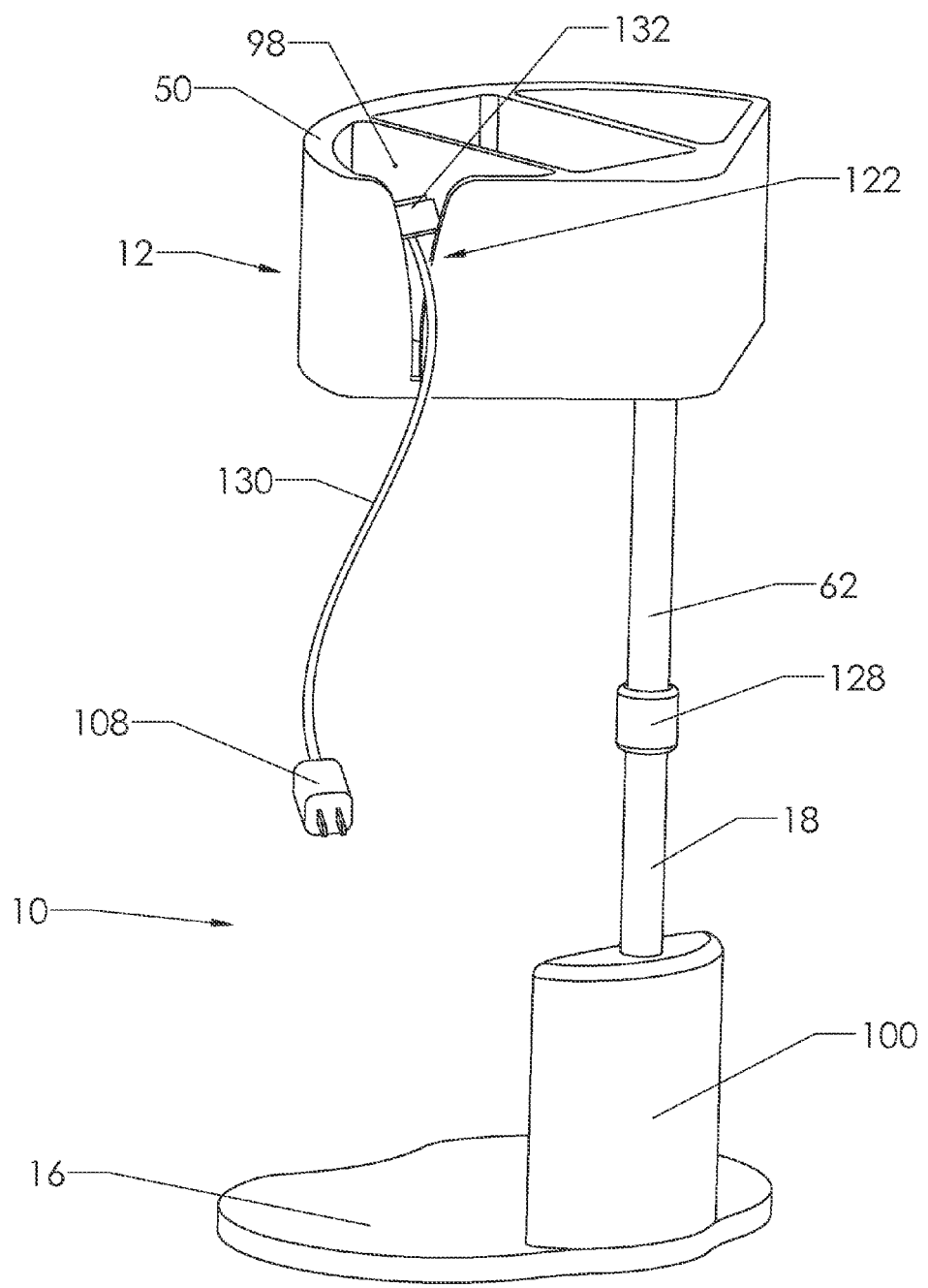
FIG. 30 is a perspective view, showing a slot used to retain a cable and plug within the receptacle.

FIG. 30 shows an alternate embodiment of the present invention. In this embodiment, receiver 12 preferably includes cable slot 122. As illustrated, cable slot 122 preferably begins larger proximate upper surface 50 of receiver 12 and decreases in width as the slot travels downward. This configuration allows the user to place a cable or cord 130 (such as that for a mobile phone charger or other device) into cable slot 122. As the user slides the cable (not shown) downward, the cable engages each surface of cable slot 122 and connector 132 remains within receptacle 98, thereby causing the cable to remain within receptacle 98. This is an alternate embodiment to the cable retainment means illustrated in FIGS. 24-24A.

The preceding description contains significant detail regarding the novel aspects of the present invention. It should not be construed, however, as limiting the scope of the invention but rather as providing illustrations of the preferred embodiments of the invention. As an example, although the illustrated embodiments show a design incorporating a removable cup holder, the invention could includes an integral cup holder and receiver or a series of receptacles without a cup holder. Such variations would not alter the function of the invention. Thus, the scope of the invention should be fixed by the following claims, rather than by the examples given.

Having described my invention, I claim:
1. An object-holding stand, comprising:
a. a base;
b. a support extending from said base;
c. an upright extending from said support;
d. an extension slide, slidably attached to said upright;
e. a receiver attached to said extension slide wherein said receiver has a cutout;
at least one receptacle formed by said receiver;
g. a locking mechanism for selectively locking and unlocking said extension slide to said upright, thereby allowing an adjustment of a selectable separation distance between said base and said receiver;
h. wherein said stand is configured to hold a plurality of objects for a user; and
i. wherein said receiver has an upper surface.
2. The object-holding stand as recited in claim 1, wherein said receiver further comprises a receiver relief and a removable receptacle configured to engage with said upper surface of said receiver.
3. The object-holding stand as recited in claim 1, wherein said receptacle contains a slot configured to accommodate a cable.
4. The object-holding stand as recited in claim 3, wherein said slot is wider at an upper end of said slot than at a lower end of said slot.
5. The object-holding stand as recited in claim 1, wherein said receiver is rotatably adjustable with respect to said base.
6. The object-holding stand as recited in claim 1, wherein:
a. said upright is a hollow tube having an inside diameter;
b. said extension slide is a hollow tube having an outside diameter;
c. said outside diameter of said extension slide is a sliding fit within said inside diameter of said upright; and
d. wherein said extension slide arid said upright are configured to lock into a set position.
7. The object-holding stand as recited in claim 1, wherein said at least one receptacle has a charging dock.
8. The object-holding stand as recited in claim 7, further comprising:
a. a cord attached to said base; and
b. an electrical connection between said charging dock and said cord.
9. The object-holding stand as recited in claim 4, wherein said slot of said receptacle houses a cord.
10. An object-holding stand, comprising:
a. a base, configured to slide beneath a mattress of a bed;
b. an support extending from said base;
c. an upright extending from said support upright;
d. an extension slide attached to said upright at a locking mechanism;
e. a receiver attached to said extension slide, wherein said receiver has a cutout;
f. wherein said locking mechanism is configured to selectively lock and unlock said extension slide to said upright, thereby allowing an adjustment of a selectable separation distance between said base and said receiver; and
g. wherein said receiver forms a central receptacle and at least two secondary receptacles.
11. The object-holding stand as recited in claim 10, wherein said at least one of said at least two secondary receptacles contain a slot configured to accommodate a cable.
12. The object-holding stand as recited in claim 11, wherein said slot s wider at an upper end of said slot than at a lower end of said slot.
13. The object-holding stand as recited in claim 10, wherein said receiver is rotatably adjustable with respect to said base.
14. The object-holding stand as recited in claim 10, wherein:
a. said upright is a hollow tube having an inside diameter;
b. said extension slide is a hollow tube having an outside diameter;
c. said outside diameter of said extension slide is a sliding fit within said inside diameter of said upright; and
d. wherein said extension slide and said upright are configured to lock into a set position.
15. The object-holding stand as recited in claim 10, wherein said central receptacle has a charging dock.
16. The object-holding stand as recited in claim 10, wherein at least one of said at least two secondary receptacles has a charging dock.
17. The object-holding stand as recited in claim 15, further comprising:
a. a cord attached to said base; and
b. an electrical connection between said charging dock and said cord.
18. The object-holding stand as recited in claim 16, further comprising:
a. a cord attached to said base; and
b. an electrical connection between said charging dock and said cord.
19. The object-holding stand as recited in claim 10, wherein said receiver is rotatably adjustable with respect to said base.
20. An object-holding stand, comprising:
a. a base;
b. a support upright extending from said base;
c. an upright extending from said support upright;
d. an extension slide attached to said upright;
e. a receiver attached to said extension slide, wherein said receiver has a cutout;
f. a plurality of receptacles fully integrated with said receiver;
g. wherein at least one of said plurality of receptacles includes a slot configured to accommodate a cord;

h. a locking mechanism for selectively locking and unlocking said extension slide to said upright, thereby allowing an adjustment of a selectable separation distance between said base and said receiver; and
i. wherein said locking mechanism is configured so that it is possible to release said locking mechanise by depressing a release button.

* * * * *